United States Patent
Ling et al.

(10) Patent No.: US 7,228,793 B2
(45) Date of Patent: Jun. 12, 2007

(54) CARBONATION SYSTEM FOR ENHANCING THE FLAVOR OF FRUITS AND VEGETABLES

(75) Inventors: Qingyue Ling, Beaverton, OR (US); Galen D. Kaufman, Galveston, TX (US); John Henry Wells, Portland, OR (US); Bryce L. Hesterman, Fort Collins, CO (US)

(73) Assignees: Fizzy Fruit, LLC, Portland, OR (US); Oregon State University, Corvallis, OR (US)

( * ) Notice: Subject to any disclaimer, the term of this patent is extended or adjusted under 35 U.S.C. 154(b) by 215 days.

(21) Appl. No.: 10/304,197

(22) Filed: Nov. 25, 2002

(65) Prior Publication Data

US 2004/0101606 A1 May 27, 2004

(51) Int. Cl.
 *A23B 7/00* (2006.01)
(52) U.S. Cl. .............................. 99/468; 99/472; 99/476
(58) Field of Classification Search .................. 99/467, 99/468, 480, 481, 472, 473–474, 476; 426/231
See application file for complete search history.

(56) References Cited

U.S. PATENT DOCUMENTS

| 226,094 | A | 3/1880 | Mefford |
| 609,590 | A | 8/1898 | de Santa Cruz |
| RE14,489 | E | 6/1918 | Franks |
| 2,001,628 | A | 5/1935 | Nierinck ............................ 99/8 |
| 2,483,064 | A | 9/1949 | Reich ............................ 62/170 |
| 3,102,777 | A | 9/1963 | Bedrosian et al. |
| 3,627,393 | A | 12/1971 | Hickson et al. ............ 312/31.1 |
| 3,764,348 | A | 10/1973 | Huxsoll et al. .............. 426/310 |
| 3,773,527 | A | 11/1973 | Ruggerone ................... 426/106 |
| 3,924,010 | A | 12/1975 | Erb .............................. 426/312 |
| 4,022,119 | A | 5/1977 | Karr .............................. 99/275 |
| 4,040,342 | A | 8/1977 | Austin et al. ............... 99/323.1 |
| 4,055,931 | A | 11/1977 | Myers ............................ 53/22 |

(Continued)

FOREIGN PATENT DOCUMENTS

EP 160325 11/1985

(Continued)

OTHER PUBLICATIONS

"Gas-atmosphere packaging," Modern Packaging, Oct. 1969.

(Continued)

*Primary Examiner*—Drew Becker
(74) *Attorney, Agent, or Firm*—Mark R. Backofen; Locke Liddell & Sapp LLP

(57) ABSTRACT

A carbonation system is disclosed that effectively controls the treatment of fruits and vegetables with $CO_2$ gas, providing enhanced flavor to fruits and vegetables. One embodiment of the invention uses a microprocessor to preferably monitor and control the pressure, temperature and gas flow within a sealable enclosure to effectively control the carbonation of fruits and vegetables. Another embodiment consists of a combination carbonation system and cooler that effectively controls the carbonation of fruits and vegetables by including pressure relief devices and an insulation cover. The insulation cover has apertures that provide for the distribution of $CO_2$. A third embodiment is disclosed that also consists of a combination carbonation system and cooler. This third embodiment controls carbonation by including, among other features, feedback mechanisms and a pressure relief device. A method of using the first embodiment is also provided.

85 Claims, 10 Drawing Sheets

U.S. PATENT DOCUMENTS

| | | | |
|---|---|---|---|
| 4,352,827 A | 10/1982 | Fleming et al. | |
| 4,627,336 A | 12/1986 | Nam | 99/467 |
| 4,685,305 A | 8/1987 | Burg | |
| 4,716,739 A | 1/1988 | Harris et al. | 62/78 |
| 4,745,609 A | 5/1988 | Yoshikawa | 372/29 |
| 4,748,030 A * | 5/1988 | Illy | 426/233 |
| 4,754,609 A | 7/1988 | Black | 62/59 |
| 4,754,611 A * | 7/1988 | Hosaka et al. | 62/78 |
| 4,804,552 A | 2/1989 | Ahmed et al. | 426/580 |
| 4,843,956 A | 7/1989 | Lashlee | 99/468 |
| 4,882,097 A | 11/1989 | Shannon | 261/35 |
| 4,919,960 A | 4/1990 | Ahmed et al. | 426/580 |
| 4,943,440 A | 7/1990 | Armstrong | 426/118 |
| 4,947,650 A | 8/1990 | Blanton et al. | 62/50.1 |
| 5,156,009 A | 10/1992 | Woodruff | 62/78 |
| 5,156,871 A | 10/1992 | Goulet et al. | 426/477 |
| 5,208,058 A * | 5/1993 | Kotani et al. | 426/486 |
| 5,244,686 A | 9/1993 | Fukuyama et al. | 426/575 |
| 5,277,922 A | 1/1994 | Rejimbal, Jr. et al. | 426/333 |
| 5,355,781 A * | 10/1994 | Liston et al. | 99/476 |
| 5,511,379 A | 4/1996 | Gibot et al. | 62/602 |
| 5,520,941 A * | 5/1996 | Oosterling | 426/232 |
| 5,648,607 A | 7/1997 | Wolf | 73/332 |
| 5,656,313 A | 8/1997 | Gibney et al. | 426/231 |
| 5,658,607 A | 8/1997 | Herdeman | 426/263 |
| 5,743,433 A | 4/1998 | Hawkins et al. | 222/64 |
| 5,941,752 A | 8/1999 | Liebermann | 446/220 |
| 5,968,573 A | 10/1999 | Kaufman | 426/410 |
| 6,092,430 A * | 7/2000 | Liston et al. | 73/863.81 |
| 6,131,404 A | 10/2000 | Hase et al. | 62/384 |
| 6,379,728 B1 * | 4/2002 | Roth | 426/231 |

FOREIGN PATENT DOCUMENTS

| | | | |
|---|---|---|---|
| EP | 292834 | 11/1988 | |
| FR | 510697 | 12/1920 | 426/312 |
| FR | 2270531 | 5/1975 | |
| GB | 1426917 | 3/1976 | |
| JP | 60-126032 | 7/1985 | |
| JP | 01169289 A * | 7/1989 | |
| JP | 04003875 A * | 1/1992 | |
| JP | 60-169691 | 6/1994 | |
| NL | 57388 | 8/1944 | |

OTHER PUBLICATIONS

Kaloyereas, Socrates A., Use of Dry Ice and CO2 for Food Preservation, Refrigerating Engineering, May 1949, vol. 57, No. 5, The American Society of Refrigeration Engineers, NY.

* cited by examiner

CARBONATION SYSTEM FOR ENHANCING THE FLAVOR OF FRUITS AND VEGETABLES

FEDERAL FUNDING

This invention was made, at least in part, using funds provided by the United States Department of Agriculture/ CSREES 00-34302-9206. The United States government may have rights in this invention.

BACKGROUND OF THE INVENTION

1. Field of the Invention

The present invention relates to a system for optimally controlling the carbonation of food. More particularly, this invention efficiently and effectively controls the exposure of fruits or vegetables to carbon dioxide gas, resulting in the enhanced flavor of the fruits or vegetables.

2. Description of Related Art

The carbonation of beverages, like soft drinks and juices, has been around for centuries. Yet, even today, there is an endless thirst for their enhanced taste or "tingly fizz." As a result of this popularity, carbonation has spread to food items and additional beverages. Milk, coffee, tea, yogurt and even breakfast cereals are now carbonated for the purpose of adding a new and exciting taste. More interestingly, carbonation has spread to fruits and vegetables. U.S. Pat. No. 5,968,573, as herein incorporated by reference, discloses a method for enhancing the flavor of fruits and vegetables by exposure to $CO_2$ gas. Long-known nutritious snacks including, but not limited to, pears, grapes, oranges, nectarines, grapefruit, strawberries, cucumbers and tomatoes attain a new and exciting taste when exposed to $CO_2$. These "fizzy" nutritious snacks are a healthy alternative to the carbonated drinks or juices that lack vitamins, minerals and other nutrients and provide hefty amounts of empty calories. Treating fruits and vegetables with $CO_2$ enhances both the flavor and experience of consuming the carbonated food, rendering healthy food more appealing to consumers.

As disclosed in U.S. Pat. No. 5,968,573, enhancing the flavor of fruits and vegetables through exposure to $CO_2$ gas can be achieved by storing the produce in a cooler or other container packed with frozen $CO_2$ or "dry ice." (A strongly carbonated water environment can also be used to expose the food item to $CO_2$.) The produce remains in the cooler or other container for approximately several hours, the amount of time varying depending on the specific type of fruit or vegetable and whether the fruit or vegetable is fresh or preserved in some other way. The produce is separated from the dry ice typically by a non-heat conductive barrier to prevent freezing. Once in the closed environment, the $CO_2$ will begin to sublimate and create a cold and heavy $CO_2$ atmosphere. The food item placed in the closed $CO_2$-rich environment will, over time, take up enough $CO_2$ within its tissue to provide the fruit or vegetable with an effervescent character. The effect of $CO_2$ exposure on fruits and vegetables can be reproduced in 2-12 hours, by storing fresh fruit in a cooler or other container with 5-10 pounds of dry ice. When removed from the cooler or other container, the fruits and vegetables are covered with a material capable of inhibiting the loss of $CO_2$, such as a material that is easily removable or edible. The effect of the $CO_2$ exposure remains in the produce for some time after removing the produce from the cooler or other container.

Storing produce in a cooler or other container packed with dry ice and using only a non-heat conductive barrier to separate the produce from the dry ice, however, is problematic in that the carbonation is not always consistent. The user has to choose the duration the fruits or vegetables remain in the cooler or other container. If the user leaves the fruits or vegetables in the cooler or other container too long, deterioration of the fruits and vegetables may occur due to physiological changes caused by the high $CO_2$ level or low oxygen level inside the fruit and vegetables. However, if the user does not leave the fruits or vegetables in the cooler or other container long enough, a strong "fizz" will not be achieved. The user also has to choose an appropriate amount of dry ice to be placed in the cooler or other container corresponding to the volume of space inside the cooler or other container. If the amount of dry ice is inappropriate, too little or too much pressure or too high or too low of a temperature can result. Extreme pressure sealed within the cooler or other container can lead to an explosion. On the other hand, if the pressure is too low within the cooler or other container, a strong fizz may not be produced. Too low a temperature can result in the freezing of the fruits or vegetables, while too high a temperature may not produce a strong fizz or desired taste. Furthermore, the non-heat conductive barrier lacks apertures that allow for the even distribution of $CO_2$ into the area where the fruits and vegetables are stored. If the fruits or vegetables are not adequately separated from the dry ice by the non-heat conductive barrier, freezing can easily occur.

U.S. Pat. No. 5,968,573 also discloses that a 20-pound $CO_2$ tank and a regulator can be used to pump $CO_2$ into a closed container to carbonate fruits and vegetables, providing them with an effervescent quality. It is disclosed that the produce remains in the closed container for a varying amount of time depending on the specific type of fruit or vegetable, the temperature of the surrounding environment and the carbonation pressure. Also, an apparatus has been manufactured where the 20-pound $CO_2$ tank, having a regulator, pumps $CO_2$ into a closed container that is similar in shape and size to the $CO_2$ tank. The $CO_2$ is preferably pumped into the closed container through several conduits. However, using the apparatus as disclosed in the above-mentioned patent, and the manufactured apparatus, can be dangerous and entails awkward equipment that is inconvenient and burdensome. The closed container that holds the fruits and vegetables to be carbonated lacks a pressure relief device, which is needed to release excess $CO_2$ pressure, preventing an explosion caused by extreme pressure sealed within the closed container. Furthermore, keeping the container cool to optimize the carbonation of fruits or vegetables is problematic. The container does not have its own temperature control source and will not fit into standard refrigerators. Yet again, the carbonation of the fruits or vegetables is not always consistent. The user has to determine the appropriate amount of $CO_2$ to release into the closed container depending on the type of fruit or vegetable involved, and the user has to determine the amount of time needed for the particular fruit or vegetable to acquire a favorable effervescent flavor. Determining these amounts may not always provide an efficient and effective way to carbonate fruits or vegetables.

A carbonation system specifically designed for fruits and vegetables is therefore needed that achieves optimal or desired carbonation levels regardless of the type of produce. The carbonation system needs to be able to effectively and efficiently control the environment within a sealable enclosure and be able to increase or decrease the amount of $CO_2$ that flows into or out of the sealable enclosure. The carbonation system needs to be easy to maintain, safe, convenient, compact and ideal for private and commercial use in places that would extend from restaurants, to kiosks, to grocers, to homes, to the outdoors. These and other advantages are provided by the invention disclosed below.

SUMMARY OF THE INVENTION

The carbonation system disclosed herein provides a more efficient and effective way to enhance the flavor of fruits and vegetables through exposure to $CO_2$ gas. According to one embodiment of the invention, a microprocessor preferably monitors and controls the carbonation pressure inside a sealable enclosure to provide for consistent carbonation. The sealable enclosure has a pressure sensor that measures the carbonation pressure level inside the sealable enclosure and sends signals to the microprocessor informing the microprocessor of the pressure level. If needed, the microprocessor can adjust the amount and rate of $CO_2$ being supplied to, and released from, the sealable enclosure by using remote or electrical signals to turn on and off valves.

By being able to monitor and control the carbonation pressure within the sealable enclosure, the microprocessor can detect the carbonation saturation level of the fruits and vegetables. During carbonation, the carbonation pressure inside the sealable enclosure decreases as $CO_2$ is dissolved into the fruits or vegetables, and the lack of a change in pressure inside sealable enclosure indicates that no more $CO_2$ can be dissolved. Therefore, assuming that the pressure change inside the sealable enclosure is proportional to the amount of $CO_2$ being absorbed into the food item, the carbonation process is considered complete if the pressure change in the sealable enclosure is close to zero for an extended period of time. The extended period of time can be predetermined depending on the type and mass of the fruits and vegetables to be carbonated. Regulating the pressure change within the sealable enclosure allows the fruits or vegetables to be fully carbonated at the minimum carbonation time no matter the type of food item being treated.

However, it should be recognized that other changes within the carbonation system can be measured to determine the carbonation saturation level of the fruits or vegetables, which can predict when the carbonation process is complete. For example, during carbonation a load cell can be used to measure the change in the mass of the fruits and vegetables to detect the carbonation saturation level. In addition, the change of pH inside the fruits or vegetables during carbonation can be measured to determine the saturation level. Despite the ability to measure other changes within the carbonation system to provide for efficient and effective carbonation, the disclosure below will, for the most part, concentrate on measuring pressure changes within the carbonation system.

In the first embodiment, the valves that the microprocessor controls to adjust the amount and rate of $CO_2$ supplied to, and released from, the sealable enclosure are preferably of two types. The first type is used to control the $CO_2$ flow in and out of the sealable enclosure. The second type, a flow rate control valve, controls the $CO_2$ flow rate in and out of the sealable enclosure, which allows for a more accurate carbonation pressure setting. A pressure relief device is also part of the first embodiment and allows for more consistent carbonation by releasing carbonation pressure from the sealable enclosure when too much pressure accumulates inside the sealable enclosure. Allowing the release of accumulated carbonation pressure from the sealable enclosure is a safety feature of the invention.

A $CO_2$ source is preferably stored within the carbonation system and can include, but is not limited to, a $CO_2$ cylinder; a $CO_2$ generator; a container at least partially filled with dry ice; or a container that allows for the production of $CO_2$ from the mixture of sodium bicarbonate and an acid, such as lemon juice or hydrochloric acid. A temperature control source is also included as part of the invention and is used to cool the sealable enclosure during carbonation. A temperature sensor can also be used to measure the temperature inside the sealable enclosure and can send signals to the microprocessor informing the microprocessor of the temperature inside the sealable enclosure. If needed, the microprocessor can adjust the temperature inside the sealable enclosure by turning on and off the temperature control source. By controlling the temperature within the sealable enclosure, the microprocessor maximizes the amount of $CO_2$ absorbed by the fruits and vegetables, resulting in more effective carbonation. The cooler the temperature in the sealable enclosure (above freezing), the more $CO_2$ absorbed by the fruits or vegetables.

The microprocessor can also use signals to activate a vacuum generator before the carbonation process begins. The vacuum generator of the invention removes the air or undesired gases inside the sealable enclosure and inside the food items within the sealable enclosure before $CO_2$ is allowed to enter the sealable enclosure. The sealable enclosure can then be filled with 100% $CO_2$ gas, which allows for an increased absorption rate and an increase in the amount of $CO_2$ absorbed. Using the vacuum generator is especially beneficial when a large volume of food is to be carbonated. A display device, an input device, a power supply, an alarm and an electric switch to commence the carbonation process are also preferred features of the first embodiment.

The carbonation system of this first embodiment desirably has many safety features. The microprocessor of the invention monitors the system, ensuring the system is working properly. If the system develops a problem such as a leak or excess pressure during carbonation, to alert the user, the microprocessor will sound the alarm and provide an error notice on the display. The microprocessor is also able to quickly depressurize the sealable enclosure by opening an outlet valve when a problem arises and will not commence the carbonation process if the sealable enclosure is not completely sealed. Moreover, the carbonation system, for safety reasons, will not allow the cover or door of the system to be opened during the carbonation process.

Another safety aspect of the invention is the sealable enclosure, which provides the necessary strength and safety required for the pressurized carbonation process, including the vacuuming process. The sealable enclosure also provides an enclosed environment for carbonation, maintains high thermal efficiency for carbonation temperatures lower than room temperature and provides an easy but safe way for loading and unloading of the food item. The sealable enclosure of the invention preferably has an internal container, which provides a quick and easy way to load and unload the food item, allows for different configurations depending on the type of food item being exposed to $CO_2$ and can be cleaned with relative ease. The sealable enclosure can be designed either as a stand-alone programmable appliance, as a large carbonation system for the mass production of carbonated fruits or vegetables, as a cooler for outdoor or indoor use or as a refrigerator drawer unit.

A second embodiment of the invention is a combination carbonation system and cooler that can effectively control the carbonation of fruits and vegetables. The combination carbonation system and cooler includes a sealable, thermally insulated container having two chambers, namely a $CO_2$ chamber and an insulated food chamber. An insulation cover with apertures separates the $CO_2$ chamber from the insulated food chamber. If the user desires to use the thermally insulated container to carbonate fruits or vegetables, the $CO_2$ chamber can preferably hold two dry ice containers, while the insulated food chamber can hold the fruits or vegetables to be carbonated. However, if the user desires to use the thermally insulated container as a cooler instead of carbonating fruits or vegetables, wet ice, dry ice or another cooling device can be used to keep food products or beverages in the insulated food chamber cool.

Each of the two dry ice containers used during carbonation desirably has two out-flow ports attached to laterally extending conduits by connectors. When carbonating fruits or vegetables $CO_2$ gas is released from the dry ice containers and preferably into the conduits through the out-flow ports and connectors. The $CO_2$ then passes desirably through apertures in the conduits, through apertures in the insulation cover and into the insulated food chamber to carbonate the fruits or vegetables. The apertures in the conduits and in the insulation cover are preferably of generally uniform diameter and generally uniformly spaced to allow for $CO_2$ to evenly distribute into the insulated food chamber, providing consistent carbonation.

Another feature of the second embodiment is a support located in the $CO_2$ chamber. The support holds the conduits in place during carbonation to allow for even distribution of $CO_2$, and provides horizontal support for the dry ice containers. A cooler pressure relief device and dry ice container pressure relief devices are also part of the invention and release excess pressure during carbonation, which allows for more effective carbonation and safety. The dry ice container pressure relief devices can also be used to release $CO_2$ to carbonate the fruits or vegetables if the conduits and the out-flow ports are not desired.

Another embodiment of the invention also discloses a combination carbonation system and cooler that can effectively control the carbonation of the fruits and vegetables. A thermally insulated container internally comprises an insulated food chamber and a $CO_2$ cylinder chamber. If the user desires to use the thermally insulated container to carbonate fruits and vegetables, the $CO_2$ cylinder chamber can preferably hold two $CO_2$ cylinders, while the insulated food chamber can hold the fruits and vegetables to be carbonated. However, if the user desires to use the thermally insulated container as a cooler, wet ice or another cooling device can be used to keep the food products or beverages in the insulated food chamber cool.

When the thermally insulated container is used to carbonate fruits or vegetables, a microprocessor desirably monitors the $CO_2$ saturation level of the fruits or vegetables inside the thermally insulated container to provide for more effective carbonation. To detect the $CO_2$ saturation level, the thermally insulated container desirably has a pressure sensor, but can have other measuring devices. The pressure sensor, for example, measures the carbonation pressure level inside the insulated food chamber and sends signals to the microprocessor informing the microprocessor of the pressure level. If needed, the microprocessor can alert the user to turn on or off the flow of $CO_2$ into the insulated food chamber.

When the user desires to carbonate fruits or vegetables, and before the $CO_2$ cylinders are placed in the $CO_2$ cylinder chamber, the ends of the $CO_2$ cylinders that are opposite the ends containing out-flow ports, are preferably attached to $CO_2$ cylinder holders. The attached $CO_2$ cylinders and $CO_2$ cylinder holders are then placed through an opening in the thermally insulated container and placed into the $CO_2$ cylinder chamber. A $CO_2$ cylinder housing guides the $CO_2$ cylinders into position so that the out-flow ports of the $CO_2$ cylinders connect to a pin valve, while the $CO_2$ cylinder holders can be attached to the thermally insulated container.

Once the $CO_2$ cylinders are connected to the pin valve, the pin valve is opened. $CO_2$ flows out of the out-flow ports of the $CO_2$ cylinders, through the pin valve and desirably into two conduits, which are each attached to valves. The valves can be opened or closed by the user. If the valves are opened, $CO_2$ is allowed to flow from the two conduits, through the valves and into desirably four conduits that communicate with the insulated food chamber. The $CO_2$ then flows through the four conduits and into the insulated food chamber, where the fruits and vegetables are then carbonated. A pressure relief device is also part of the invention and provides for consistent carbonation and safety. The pressure relief device is desirably located in a wall of the thermally insulated container and releases built-up pressure from the insulated food chamber to the outside of the thermally insulated container.

Other features of this embodiment include a fan and a temperature control source attached to the underside of the lid of the thermally insulated container, and a temperature sensor that sends signals to the microprocessor to turn on or off the temperature control source and the fan if desired. A housing that protects the out-flow ports and the pin valve, a power source, a display device, an input device, an indication light and an alarm are also features of this embodiment. When the user desires to utilize the thermally insulated container as a cooler, plugs can be used to plug the four conduits attached to the insulated food chamber. Plugging the conduits prevents food particles, liquids or other debris in the insulated food chamber from blocking the interior of the conduits. If food particles, liquids or other debris block the interior of the conduits, the conduits will be rendered useless during carbonation.

According to yet another embodiment of the invention, a method of using the carbonation system of the first embodiment is disclosed that comprises the steps of placing the fruits or vegetables in the sealable enclosure, inputting specific information to set desired conditions for carbonation, evaluating whether to remove ambient air and gasses from the system, closing the out-flow control valves, opening the in-flow control valve, measuring the internal carbonation pressure (P2), comparing the P2 to the desired pressure (P0), evaluating whether to adjust the flow rate of $CO_2$, measuring and comparing the internal carbonation pressure to the desired pressure, closing the in-flow control valve, measuring the internal carbonation pressure (P4), allowing the fruits or vegetables to absorb the $CO_2$, measuring and comparing the internal carbonation pressure (P5) to P4, allowing the system to remain in equilibrium for an extended period of time, opening the out-flow control valves to gradually release $CO_2$, evaluating whether to open the outflow rate control valve to control the gradual release of the $CO_2$, checking the internal carbonation pressure, sounding the alarm and unloading the carbonated fruits or vegetables.

The carbonation system of the invention is specifically designed for fruits and vegetables and achieves optimal or desired carbonation levels regardless of the type of produce. The carbonation system effectively controls the environment within a sealable enclosure and has the ability to increase or decrease the amount of $CO_2$ that flows into or out of the sealable enclosure. The carbonation system is easy to maintain, safe, convenient, compact and ideal for private and commercial use in places that extend from restaurants, to kiosks, to grocers, to homes, to the outdoors.

BRIEF DESCRIPTION OF THE DRAWINGS

The invention is further described and explained in relation to the following figures of the drawings wherein.

Like reference numerals are used to describe like parts in all figures of the drawings.

DETAILED DESCRIPTION OF THE PREFERRED EMBODIMENTS

Figure 1:
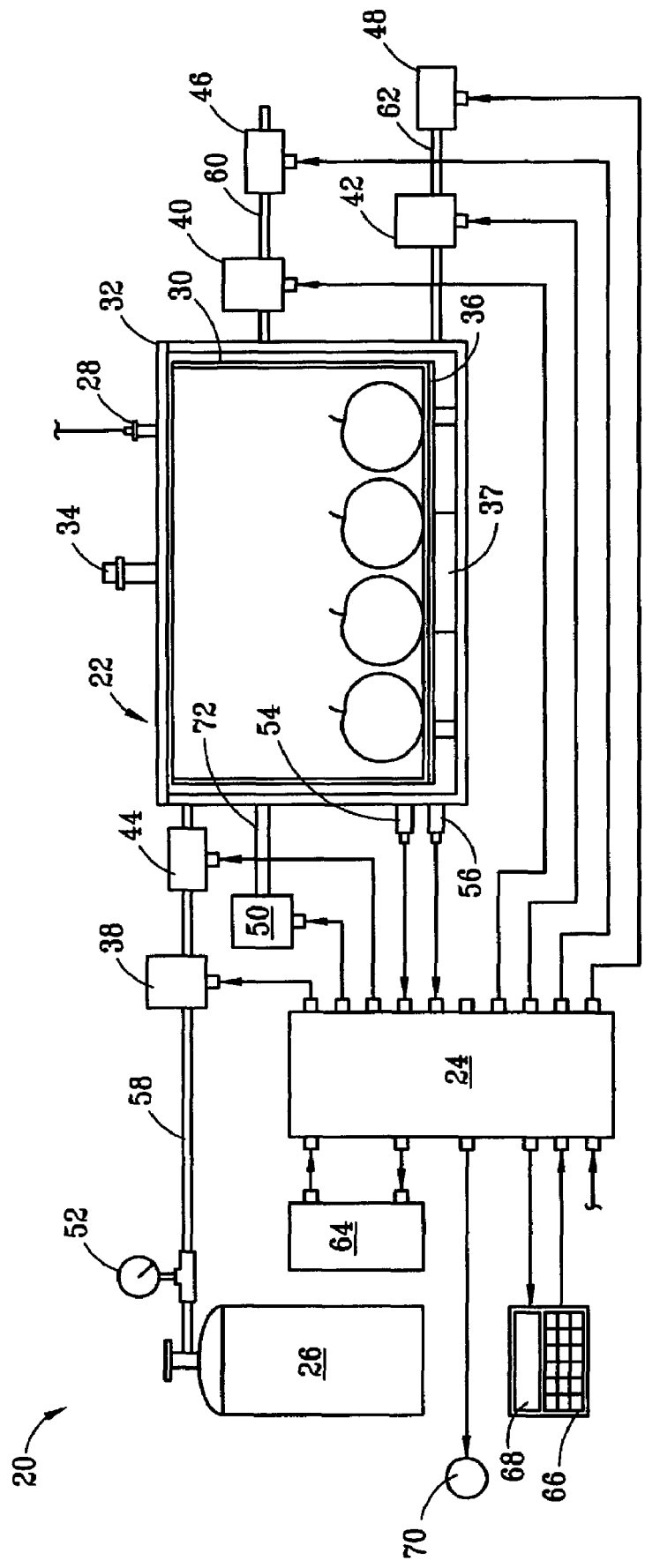
FIG. 1 is a schematic drawing of one embodiment of the present invention.

Referring to FIG. 1 of the invention, carbonation system 20 preferably includes sealable enclosure 22, which holds internal container 30. Sealable enclosure 22 preferably has cover or door 32 that is used to seal sealable enclosure 22 when the carbonation process is performed. Sealable enclosure 22 is preferably made out of thermal insulation materials to maintain high thermal efficiency for carbonation temperatures lower than room temperature (less than 20° C.). Sealable enclosure 22 can be designed either as a stand-alone programmable appliance, as a large carbonation system for the mass production of carbonated fruits or vegetables, as a cooler for outdoor or indoor use or as a refrigerator drawer unit. The size of sealable enclosure 22 is dependant on the amount of fruits and vegetables to be carbonated and the specific embodiment of the carbonation system. For example, a bench-top kitchen carbonation system has a much smaller sealable enclosure than a carbonation system for a restaurant or large outdoor party, which may have a smaller sealable enclosure than a carbonation system for the mass production of carbonated food.

Sealable enclosure 22 includes at least one pressure relief device 34, which is preferably a valve, but can be a vent, disc or other similar device. Pressure relief device 34 is preferably located on cover or door 32 of sealable enclosure 22 and is necessary for the safe use of carbonation system 20. If too much pressure builds up in sealable enclosure 22 from the intake of $CO_2$, pressure relief device 34 allows the release of the excess pressure to the outside, ensuring safety during the carbonation process. Sealable enclosure 22 also includes electric switch 28, preferably located on cover or door 32 of sealable enclosure 22. Electric switch 28 is activated when cover or door 32 is closed and when sealable enclosure 22 is sealed.

Internal container 30 fits inside sealable enclosure 22 and is removable from sealable enclosure 22 through cover or door 32. It should be recognized that internal container 30 can be any size or shape as long as internal container 30 can fit inside sealable enclosure 22. Internal container 30 can also be specifically configured for a specific type of fruit or vegetable. For example, the inside of internal container 30 can include multiple layers to allow, for instance, grapes to be separated for more efficient $CO_2$ absorption. Internal container 30 is preferably made out of stainless steal for easy cleaning, but can also be made out of polymeric material and other similar materials. Internal container 30 has four walls, a bottom and a top, which is removable so that fruits or vegetables can be placed inside. Internal container 30 preferably has apertures (not shown) that are of generally uniform diameter and generally uniformly spaced. The apertures, which are located in the walls, bottom and top of internal container 30, allow $CO_2$ to evenly distribute into internal container 30. When inside sealable enclosure 22, internal container 30 preferably sits on support structure 36. Support structure 36 lifts internal container 30 away from the base of sealable enclosure 22 so that $CO_2$ can enter internal container 30 through the bottom.

Carbonation system 20 also comprises microprocessor 24 that monitors and controls the pressure, temperature and gas flow within sealable enclosure 22. Depending on the size of the carbonation system, microprocessor 24 can be a low level 8-bit CMOS microcontroller (such as a Motorola 68HC05C) or a high level single board microprocessor (such as a Motorola MC68340). For example, a small bench-top carbonation system may use the low level 8-bit CMOS microcontroller, while a large carbonation system for mass production may use the high level single board microprocessor. However, it should be appreciated that microprocessor 24 could be any type of commercially available processor, and, thus need not be limited to any one specific type.

During carbonation, $CO_2$ from $CO_2$ source 26 desirably flows into sealable enclosure 22 through conduit 58, which includes pressure regulator 52, inlet control valve 38 and inlet rate control valve 44. The in-flow of $CO_2$ preferably first passes through pressure regulator 52, which regulates the pressure of the $CO_2$ input into sealable enclosure 22. The $CO_2$ preferably is at high pressure, typically about 30 psi to about 45 psi. After passing though pressure regulator 52, the $CO_2$ passes through inlet control valve 38. Inlet control valve 38 controls the in-flow of $CO_2$ from $CO_2$ cylinder 26 into sealable enclosure 22, based on signals received from microprocessor 24. Inlet control valve 38, when closed, does not allow $CO_2$ to flow into sealable enclosure 22. However, if microprocessor 24 sends a high signal to inlet control valve 38, inlet control valve 38 will be opened to allow $CO_2$ gas to flow into sealable enclosure 22. Inlet control valve 38 will be closed if a low signal is received from microprocessor 24.

$CO_2$ gas preferably passes through inlet flow control valve 44 after passing through inlet control valve 38 and before entering sealable enclosure 22. Inlet flow control valve 44 controls the rate $CO_2$ enters sealable enclosure 22, based on signals from microprocessor 24. Inlet flow control valve 44 has the ability to gradually decrease the flow of $CO_2$ when the system pressure is near its set pressure, without causing a pressure shock. It should be understood that not all carbonation systems require inlet flow control valve 44. However, inlet flow control valve 44 may be desired if a more accurate carbonation pressure setting is required because, without inlet flow control valve 44, a significant pressure pulse may occur by the sudden closure of inlet control valve 38, resulting in unnecessary system pressure shock.

$CO_2$ from sealable enclosure 22 desirably flows out of the system through conduit 60, which includes outlet control valve 40 and outlet flow control valve 46. Outlet control valve 40 is used to turn on and shut off the flow of $CO_2$ out of sealable enclosure 22. If a high signal is sent from microprocessor 24, outlet control valve 40 will open to let $CO_2$ gas flow out of sealable enclosure 22. Outlet control valve 40 will close if a low signal is received from microprocessor 24.

$CO_2$ gas preferably passes through outlet flow control valve 46 after the $CO_2$ has been released from sealable enclosure 22 and passed through outlet control valve 40. Outlet flow control valve 46 regulates the desired flow rate of $CO_2$ being released or unloaded from sealable enclosure 22, based on signals from microprocessor 24. If the out-flow rate of $CO_2$ is not controlled and high pressure has been applied within sealable enclosure 22, the high pressure inside sealable enclosure 22 will be reduced too quickly when the $CO_2$ is released from sealable enclosure 22, which may create a large pressure difference between the core and surface of the fruit or vegetable, causing damage to the texture or integrity of the fruit or vegetable.

Before $CO_2$ is introduced into sealable enclosure 22, microprocessor 24 may, based on the user's desire or the mass of the fruits or vegetables, send signals to activate vacuum generator 48. If a signal is sent from microprocessor 24 to vacuum generator 48, vacuum generator 48 removes the air and undesirable gases from sealable enclosure 22, creating negative pressure within sealable enclosure 22. Sealable enclosure 22 can then be filled with 100% $CO_2$, which allows for optimal $CO_2$ absorption into the fruits or vegetables, especially when a large amount of fruits or vegetables are being carbonated. The creation of negative pressure within sealable enclosure 22 reduces the amount of carbonation pressure needed to effectively carbonate the fruits and vegetables. In other words, 35 psi is needed with a pre-vacuuming of −10 psi, while 45 psi is required when vacuum generator 48 is not used.

When vacuum generator 48 is activated, the air and undesirable gases flow out of sealable enclosure 22 desirably through conduit 62, which includes out-flow control valve 42 and vacuum generator 48 located downstream from out-flow control valve 42. After the air and undesirable gases leave sealable enclosure 22, they flow through out-flow control valve 42. When vacuum generator 48 is activated, out-flow control valve 42 is used to turn on and shut off the flow of $CO_2$ out of sealable enclosure 22. If a high signal is sent from microprocessor 24, out-flow control valve 42 will open to let $CO_2$ gas flow out of sealable enclosure 22. Out-flow control valve 42 will close if a low signal is received from microprocessor 24. After the air and undesirable gases leave sealable enclosure 22 and flow through out-flow control valve 42, they flow through vacuum generator 48 and then exit carbonation system 20. It should be understood that vacuum generator 48 is optional and may not be required, for example, for small and/or portable carbonation systems for cost reasons. It should also be understood that conduit 62 and out-flow control valve 42 are optional, and vacuum generator 48 could be directly connected to sealable enclosure 22.

$CO_2$ source 26 is preferably a $CO_2$ cylinder stored within carbonation system 20. Any type of commercially available $CO_2$ cylinder can be used. For example, a smaller or non-chargeable cylinder for one-time use can be used on small portable carbonation systems for travel or outdoor use, such as a lunch box type carbonation system, or an even smaller type of carbonation system, such as a cup type carbonation system. A larger or chargeable for continuous use cylinder can be used for home or restaurant type carbonation systems.

However, it should be understood that other $CO_2$ sources can be used with the invention including, without limit, a $CO_2$ generator, a container at least partially filled with dry ice or a container that allows for the production of $CO_2$ from the mixture of sodium bicarbonate and an acid, such as lemon juice or hydrochloric acid. A $CO_2$ generator produces $CO_2$ by burning fuel or by using electricity and is usually a stand-alone device. The $CO_2$ generator will be more suitable for use with carbonation systems used in restaurants, cafeterias, grocery stores, food retail stores and other similar places. Dry ice, preferably kept in an insulated container, may be ideal for use with the portable or home carbonation appliance.

Temperature control source 50 is preferably a cooling unit connected to sealable enclosure 22 by conduit 72, but could be located within sealable enclosure 22 or connected to sealable enclosure 22 by another means, such as by an electrical means. Temperature control source 50 adjusts the temperature inside sealable enclosure 22 to maximize the amount of $CO_2$ absorbed by the fruits or vegetables regardless of the outside environment. Unlike a cooling unit that can be expensive, it should be understood that temperature control source 50 of the invention could also be, without limit, wet ice, dry ice or a cooling environment. Examples of a cooling environment include, without limitation, a refrigerator, low temperature sink or other similar cooling environment.

During carbonation, microprocessor 24 desirably monitors the carbonation pressure inside sealable enclosure 22 based on signals from pressure sensor 54. Pressure sensor 54 measures pressure inside sealable enclosure 22 to ensure the consistent carbonation of the fruits and vegetables. Pressure sensor 54 can send signals to microprocessor 24 to adjust the $CO_2$ supply in sealable enclosure 22. As a safety feature of the invention, pressure sensor 54 can also send signals to microprocessor 24 to sound alarm 70 if sealable enclosure 22 is over-pressurized or has a leak. As pressure sensor 54 is able to sense the pressure changes during the carbonation process, pressure sensor 54 can also signal microprocessor 24 to end the carbonation process when no pressure change has been detected for an extended period of time. This allows carbonation system 20 to reach the maximum level of carbonation at the given pressure level, regardless of the type of food being carbonated. The pressure change inside carbonation system 20 is also an indicator for a properly working carbonation system. For example, a sudden pressure drop may indicate the leakage of $CO_2$ from sealable enclosure 22. In addition, a slow pressure increase during the initial pressurization may also be due to a leak.

During carbonation, sealable enclosure 22 of the invention is pressurized by $CO_2$ gas at about 30 psi to about 100 psi and more preferably at about 35 psi to about 45 psi.

However, it should be recognized that the psi depends on the type and amount of fruits or vegetables being carbonated, as well as the type of carbonation system being used.

Microprocessor 24, during carbonation, also can monitor the temperature inside sealable enclosure 22 based on signals from temperature sensor 56. To adjust the temperature within sealable enclosure 22, temperature sensor 56 sends signals to microprocessor 24 to turn temperature control source 50 on or off. It should be understood that temperature sensor 56 is optional depending on the type of carbonation system. For example, a larger carbonation system, such as a carbonation system used to mass produce carbonated fruits or vegetables, may need a more precise temperature sensor to optimize the carbonation process. Accordingly, a temperature sensor that is a part of the entire room may be more suitable. Furthermore, a temperature sensor may not be practical for a small, inexpensive carbonation system, such as a lunch box type carbonation system or a cup type carbonation system.

To maximize the absorption of $CO_2$ by the fruits and vegetable during carbonation, the temperature within sealable enclosure 22 is preferably at about 1° C. to about 10° C., more preferably at about 2° C. to about 4° C.

Alarm 70, another safety device of the present invention, receives signals from microprocessor 24 to alert the user of certain circumstances during carbonation. Alarm 70 can be sounded to inform the user that the carbonation of the fruits or vegetables is complete or that the system has developed a problem, such as a leak or excess pressure.

Display device 68 and input device 66 are also preferred features of the invention. Display device 68 and input device 66 are coupled to microprocessor 24 and send signals to and receive signals from microprocessor 24. Input device 66 allows the user to input predetermined settings, such as pressure and temperature settings, based on the particular type of food to be carbonated. In order to maximize the effects of the carbonation process, the user can type in a specific setting, durations if necessary, based on the type of fruit or vegetable to be carbonated.

It should be understood that input device 66 can be a keyboard, a key pad, a set of pushbuttons or other similar devices. Display device 68, such as a liquid crystal display (LCD), informs the user of various situations, such as providing an error notice to alert the user of a leak or of over pressurization, and letting the user know that carbonation is complete. It should be understood that input device 66 is optional to the invention and is not necessary for a simple and inexpensive carbonation system or if, for example, a fixed program is set in the memory chip of microprocessor 24.

At least one load cell 37 can be mounted inside sealable enclosure 22, preferably below internal container 30, to measure the mass of fruits and vegetables within sealable enclosure 22. However, it should be understood that load cell 37 could be located anywhere within sealable enclosure 22 as long as load cell 37 could accurately measure the mass of the fruits and vegetables within sealable enclosure 22. Load cell 37 can detect the change in mass of the fruits and vegetables upon the uptake of $CO_2$ by the fruits and vegetables. As $CO_2$ is absorbed by the fruits or vegetables, their mass increases. The change in mass can be used to determine the $CO_2$ saturation level of the fruits or vegetables, which in turn will tell the user when the carbonation process is complete. Load cell 37 is preferably used in two ways to determine when the carbonation process is complete. Depending on the type of fruit or vegetable, the user can input the anticipated mass that the fruits or vegetables will weigh after carbonation. After absorbing enough $CO_2$, when the mass of the fruits or vegetables measured by load cell 37 reaches the anticipated mass, the carbonation process is considered complete. In the alternative, when the mass of the fruits or vegetables measured by load cell 37 remains constant for an extended period of time, the carbonation process is considered complete.

Load cell 37 is connected to and communicates with microprocessor 24, and is preferably included in the larger carbonation systems, such as the types used in restaurant or kiosks. If a container at least partially filled with dry ice is employed as $CO_2$ source 26, load cell 37 can also be used to predict when the carbonation process will be completed by measuring the dry ice remaining. The less dry ice remaining, the less time remaining for full saturation.

During carbonation, the pH level of the fruits or vegetables can also be measured to determine the $CO_2$ saturation level of the fruits or vegetables. As the $CO_2$ saturation level of the fruits or vegetables being carbonated increases, the pH value decreases and the electrical conductivity increases. Therefore, measuring devices can be used to measure the pH levels based on the fact that the electrical conductivity of the fruit increases as the $CO_2$ saturation level increases and the pH level decreases. For example, a probe with a pair of electrically conductive prongs could be inserted into one of the fruits or vegetables being carbonated to estimate the $CO_2$ saturation level of all the fruits or vegetables being carbonated. As the $CO_2$ saturation level increases, the electrical resistance between the probes will decrease. In addition, for example, a circuit that imposes a low-level AC voltage between two conductive plates that are placed in close proximity to the fruits or vegetables could be used to sense the electrical conductivity. The energy coupled from the plates to the fruits or vegetables will increase as the $CO_2$ saturation level of the fruits or vegetables increases. As another example, the electrical conductivity could also be sensed with an electrical circuit that delivers a small AC current to an inductive coil placed in close proximity to the fruits or vegetables. The energy coupled from the coil to the fruits or vegetables will increase as the $CO_2$ saturation level of the fruits or vegetables increases. It should be understood that other pH measuring devices or pH probes that are not mentioned above could also be used during carbonation to measure the change of pH values inside the fruits or vegetables Power supply 64 is coupled to microprocessor 24 to supply power thereto. Various power sources can be used including, but not limited to, an alternating current (AC) source, a direct current (DC) source, a solar source or other energy sources. However, the amount of power required depends on the type of carbonation system being used. For example, carbonation systems used indoors can use power supplies that provide 110/220 Volts and 50/60 Hertz. As a further example, carbonation systems used outdoors, such as those used while camping, during outdoor parties and during sporting events, can use power supplies of 6, 12 or 24 Volts.

Another embodiment of the invention, a combination carbonation system and cooler 74, is shown in FIGS. 3-9 and can be used to carbonate fruits and vegetables or, alternatively, can be used to keep food products and beverages cool. Combination carbonation system and cooler 74 comprises thermally insulated container 76, which may have the appearance and equivalent size of a standard thermally insulated container (i.e. coolers or ice chests) available in the market.

Figure 4:
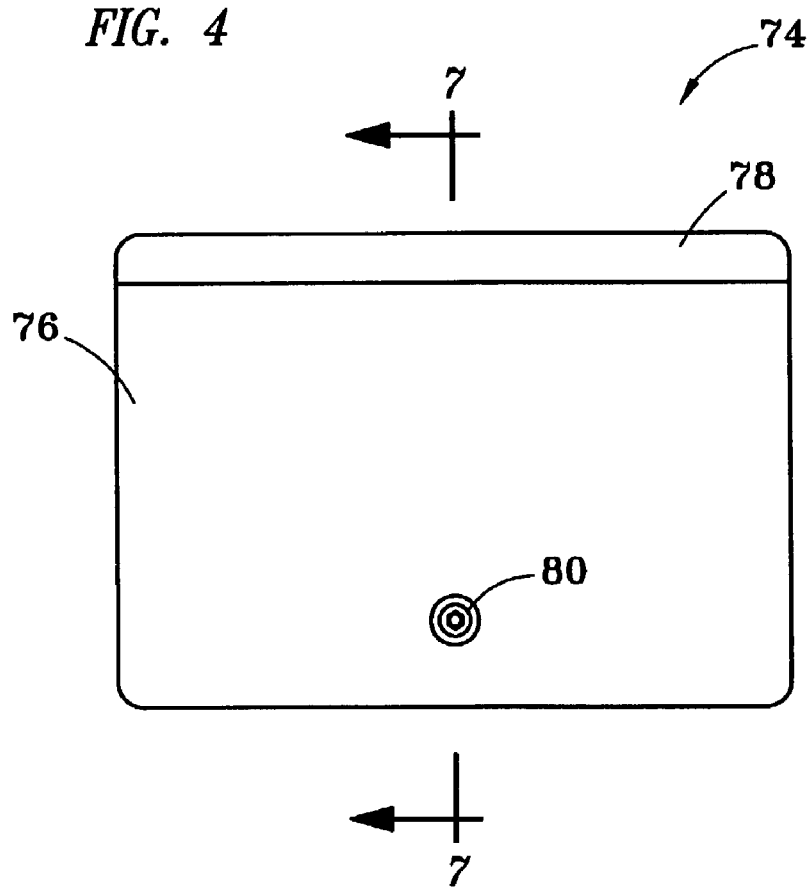
FIG. 4 is a rear view of the thermally insulated container of FIG. 3, illustrating the pressure relief device.

Referring to FIG. 4, thermally insulated container 76 comprises lid 78, which seals thermally insulated container 76 during carbonation to allow for the accumulation of moderate $CO_2$ pressures, such as about 0 psi to about 15 psi, inside thermally insulated container 76. During carbonation, thermally insulated container 76 and lid 78 must be held together by a strong hinge and lock to ensure that lid 78 does not open. The lock should be designed with a safety interlock that prevents thermally insulated container 76 from being opened until the pressure is relieved from thermally insulated container 76. Preferably, a wall of thermally insulated container 76 has pressure relief device 80 therethrough; however, pressure relief device 80 could be located anywhere on the body of thermally insulated container 76. Pressure relief device 80 is similar to pressure relief device 34 of the first embodiment and releases excess carbonation pressure in thermally insulated container 76, ensuring consistent carbonation and safety. For a low-cost combination carbonation system and cooler, it is preferred that pressure relief device 80 open at a pressure of less than 1 psi. Pressure relief device 80 is preferably a valve, but can be a vent, disc or other similar device.

Figure 5:
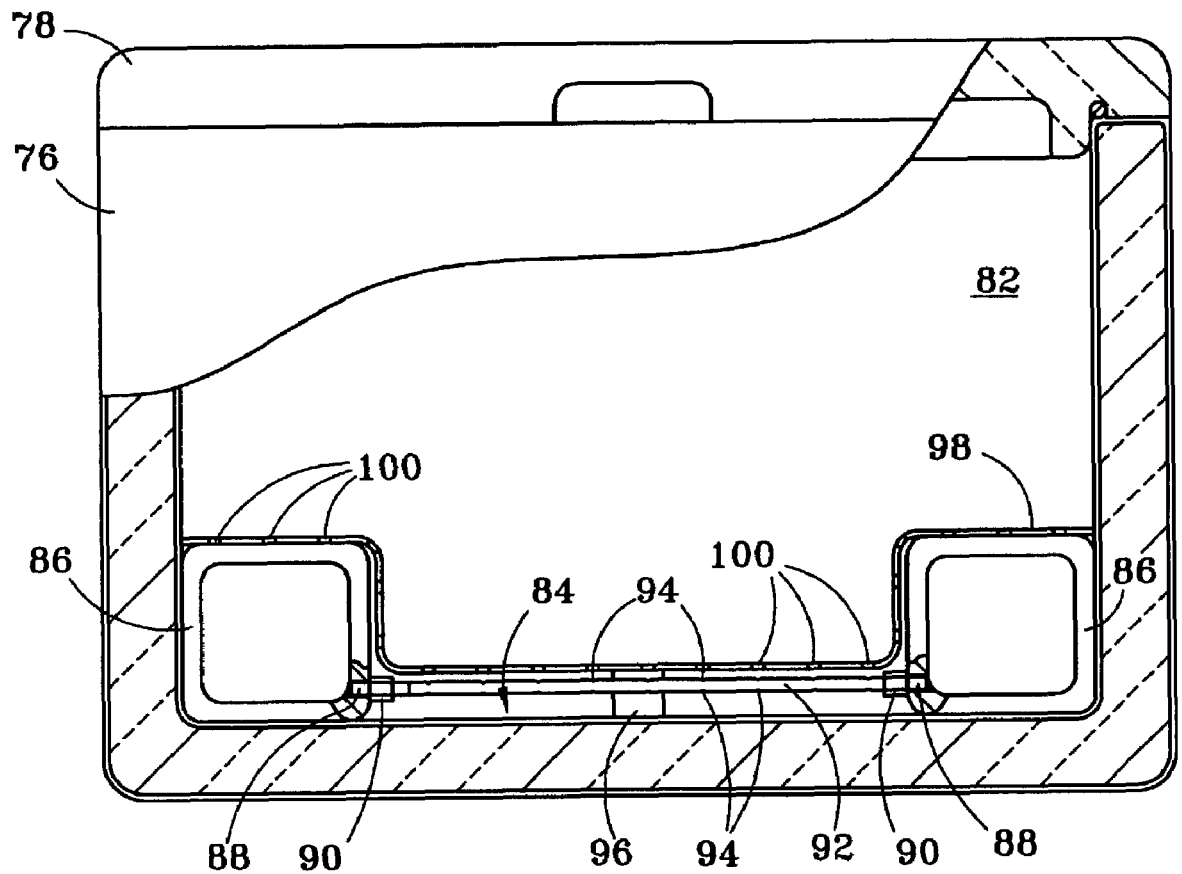
FIG. 5 is a front view, partially cut away, of the interior of the thermally insulated container of FIG. 3.
Figure 6:
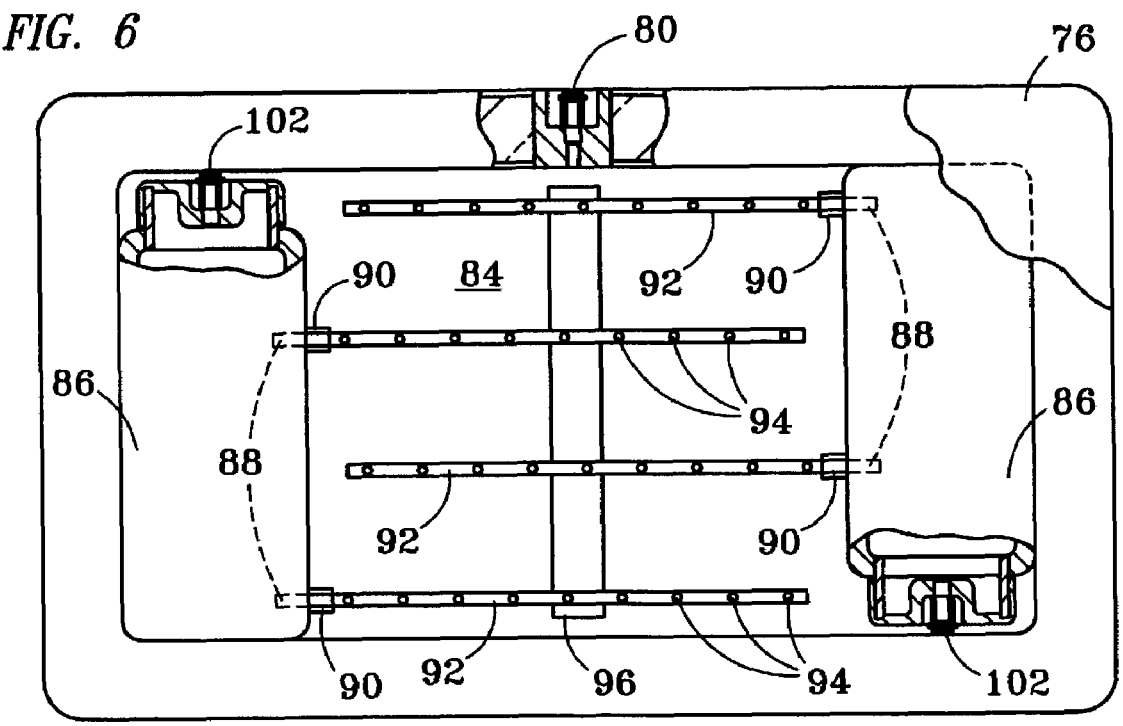
FIG. 6 is a top plan view, partially cut away, of the $CO_2$ chamber of the embodiment.
Figure 7:
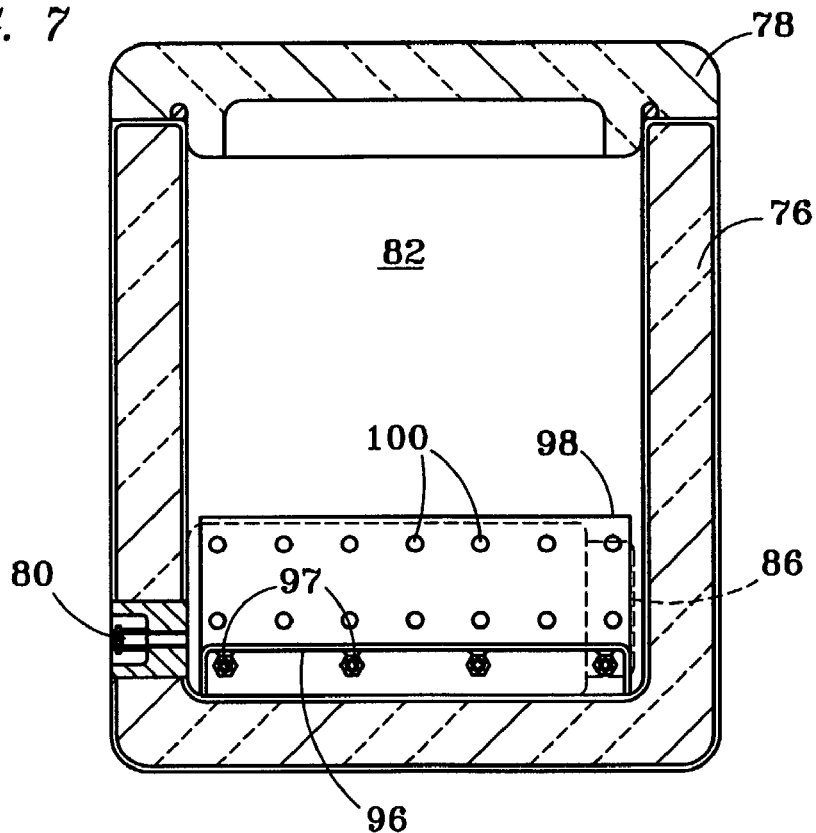
FIG. 7 is a side sectional view along line 7-7 of FIG. 4.

Turning to FIG. 5, thermally insulated container 76 internally comprises $CO_2$ chamber 84, which, if the user desires to carbonate fruits and vegetables, can preferably hold two dry ice containers 86. Thermally insulated container 76 also internally comprises insulated food chamber 82, which can hold fruits and vegetables for carbonation, or food products and beverages if the user wishes to use thermally insulated container 76 as a cooler. Insulation cover 98 separates $CO_2$ chamber from insulated food chamber 82.

For carbonation purposes, in a pressurized environment, $CO_2$ chamber 84 is preferably located below insulated food chamber 82. However, it should be understood that insulated food chamber 82 and $CO_2$ chamber 84 could be side by side or in any other configuration. The two dry ice containers 86 of $CO_2$ chamber 84 are desirably located at opposite sides of $CO_2$ chamber 84 near the bottom of thermally insulated container 76. Two dry ice containers are preferred because two dry ice containers allow for flexibility in the amount of dry ice stored in the containers. However, it is possible to use more than two dry ice containers or just one dry ice container, and the location of the dry ice containers could be in any other part of thermally insulated container 76, as long as the dry ice containers are separated from insulated food chamber 82 or separated from the fruit or vegetables to be carbonated. Dry ice containers 86 are preferably insulated and made of a material capable of withstanding temperatures of about −80° C.

Dry ice containers 86 each desirably have two out-flow flow ports 88 that are preferably connected to conduits 92 by connectors 90 which are desirably quick connectors but can be any similar type of connector. Conduits 92 are desirably rigid, extend laterally from dry ice containers 86 and desirably contain a plurality of apertures 94, which allow for the passage of $CO_2$ gas produced from the sublimation of dry ice. Apertures 94 of conduits 92 are desirably of generally uniform diameter and generally uniformly spaced to evenly distribute $CO_2$. Only one end of conduits 92 is preferably connected to dry ice containers 86, and the other end is open and unattached to allow $CO_2$ to exit. It should be understood, however, that more or less than two conduits per dry ice container is possible. Furthermore, instead of two separate conduits per dry ice container, one perforated conduit with both of its ends attached to one dry ice container may be used. However, it should be understood that conduits 92 are optional. Instead of using conduits 92, $CO_2$ gas can be released from pressure relief devices 102 (as described below) to carbonate the fruits or vegetables. It should also be understood that apertures 94 are optional depending on the level of pressure used for a particular carbonation system.

Support 96 desirably runs parallel to dry ice containers 86, and contains grooves 97 that frictionally hold conduits 92, preventing horizontal movement of dry ice containers 86 inside $CO_2$ chamber 84.

Pressure relief devices 102 of dry ice containers 86 are similar to pressure relief device 34 of the first embodiment and release excess pressure caused by the build-up of $CO_2$ in dry ice containers 86. Pressure relief devices 102 are preferably valves, but can be vents, discs or other similar devices.

Figure 8:
FIG. 8 is a side view of the preferred insulation cover.
Figure 9:
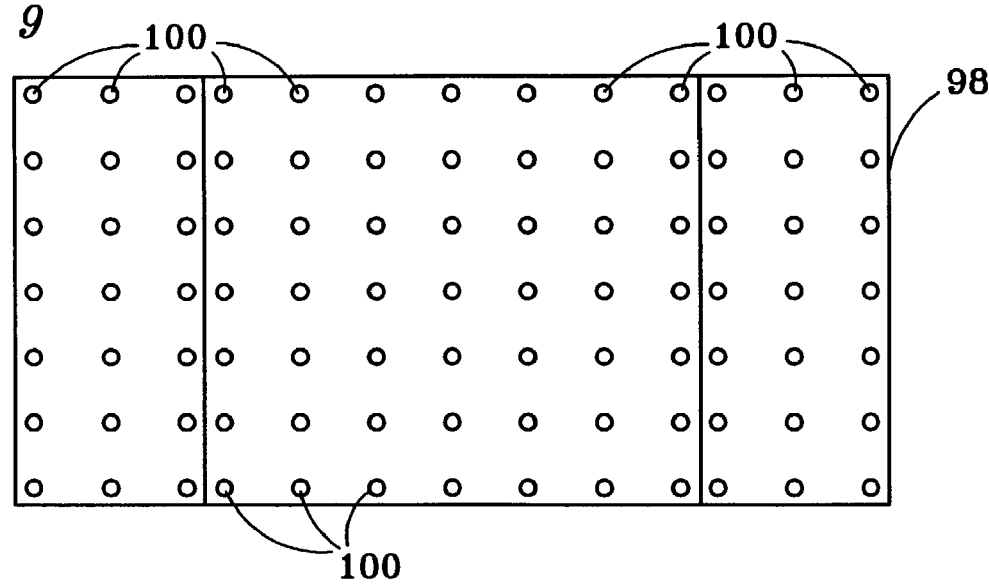
FIG. 9 is a top plan view of the preferred insulation cover illustrating the plurality of apertures through which $CO_2$ passes.

Insulation cover 98 of the invention, shown in FIGS. 8 and 9, is desirably located near the bottom of thermally insulated container 76 and, as mentioned earlier, separates $CO_2$ chamber 84 from insulated food chamber 82. Insulation cover 98 is preferably a combination heat barrier and heat conductor. Insulation cover 98 is preferably made of plastic but, it should be understood that any material may be used to separate the two chambers as long as the material is capable of cooling the food chamber and preventing the fruits or vegetables from freezing. Specific materials may include, but are not limited to, polymeric plastics, nylon or stainless steel. Insulation cover 98 contains a plurality of apertures 100 that allow $CO_2$ to travel between $CO_2$ chamber 84 and insulated food chamber 82, carbonating the food products. Apertures 100 are desirably of generally uniform diameter and are generally uniformly spaced so as to evenly distribute $CO_2$ into insulated food chamber 82. Where insulation cover 98 directly covers dry ice containers 86, insulation cover 98 will prevent the freezing of the fruits and vegetables within insulated food chamber 82. Where insulation cover 98 does not directly cover dry ice containers 86, insulation cover 98 allows cool air to pass to keep insulated food chamber 82 cool. Insulation cover 98 can also act as horizontal support for dry ice containers 86, preventing dry ice containers 86 from moving inside $CO_2$ chamber 84.

If the user desires to use thermally insulated container 76 for carbonating fruits or vegetables, attaching the preferred conduits 92 to connectors 90 of dry ice containers 86, containing dry ice, releases $CO_2$ gas from dry ice containers 86. The $CO_2$ flows through out-flow ports 88, through connectors 90 and into conduits 92. The $CO_2$ then flows out of conduits 92 through apertures 94 and into $CO_2$ chamber 84. From $CO_2$ chamber 84, the $CO_2$ flows through apertures 100 of insulation cover 98 and into insulated food chamber 82. Carbonating the fruits or vegetables can also be done without using conduits 92. If conduits 92 are removed, $CO_2$ continues to be released from pressure relief devices 102 when the pressure in dry ice containers 86 rises to a point that opens pressure relief devices 102. It is desired that pressure relief devices will open at a psi of about 0 to about 100.

It should also be understood that a microprocessor connected to a measuring device that is responsive to pressure, the pH level of the fruits or vegetables or to the electrical conductivity of the fruits or vegetables could also be part of this embodiment. The microprocessor could be used to operate a display device that indicates when the carbonation process is complete.

During carbonation, the pressure inside thermally insulated container 76 is preferably from about 0 psi to about 15 psi, more particularly from about 5 psi to about 10 psi. Again, the psi depends on the type and amount of fruits or vegetables being carbonated, as well as the type of carbonation system being used. The temperature inside thermally insulated container 76 is preferably from about 1° C. to about 20° C., more preferably from about 2° C. to about 4° C.

If combination carbonation system and cooler 74 is used to keep food products and beverages cool, wet ice, dry ice or another cooling device can be used to keep the temperature inside insulated food chamber 82 cool. If dry ice is used to cool instead of to carbonate, the dry ice in dry ice containers 86 can be employed. Although not shown, $CO_2$ release ports can be part of thermally insulated container 76 that release $CO_2$ from thermally insulated container 76 so the food products or beverages are not exposed to $CO_2$ gas and, therefore, are cooled rather than carbonated. Conduits 92 must be removed from dry ice containers 86. The $CO_2$ release ports should be positioned so that $CO_2$ released from pressure relief devices 102 is directly released through the $CO_2$ release ports. Plugs can be used to plug the $CO_2$ release ports during carbonation, so that $CO_2$ will disperse into insulated food chamber 82. Alternatively, carbonation can be prevented by rotating dry ice containers 86 so that connectors 90, without conduits 92 attached, could be connected to pressure relief device 80. If pressure relief device 80 is set to open at a lower psi than pressure relief devices 102, no $CO_2$ will enter $CO_2$ chamber 84 and all the $CO_2$ will be released outside thermally insulated container 76. However, thermally insulated container must have as many pressure relief devices 80 as there are out-flow ports 88.

Figure 10:
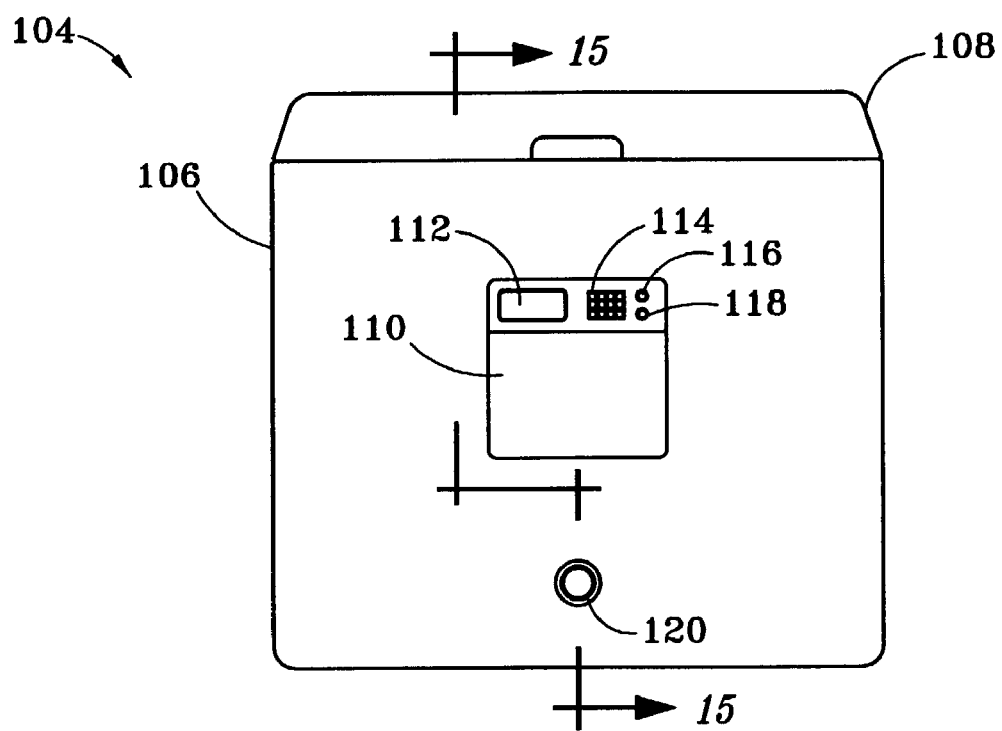
FIG. 10 is a front view of the exterior of the thermally insulated container of yet another embodiment of the invention.

A third embodiment of the invention also discloses a combination carbonation system and cooler 104. Referring to FIG. 10, thermally insulated container 106 may have the appearance and equivalent size of a standard thermally insulated container (i.e. cooler or ice chest) found in the market. Thermally insulated container 106 comprises lid 108, which seals thermally insulated container 106 during carbonation to allow for the accumulation of moderate $CO_2$ pressures, such as about 0 psi to about 15 psi, inside thermally insulated container 106. During carbonation, thermally insulated container 106 and lid 108 must be held together by a strong hinge and lock to ensure that lid 108 does not open. The lock should be designed with a safety interlock that prevents thermally insulated container 106 from being opened until the pressure is relieved from thermally insulated container 106.

Microprocessor 110 is desirably located within the outside wall of thermally insulated container 106. Microprocessor 110 is preferably an 8-bit CMOS microcontroller (68HC05C) manufactured and sold by Motorola, but could be any type of commercially available processor, and, thus need not be limited to any one specific type. Alarm 118 and indication light 116 receive signals from microprocessor 110 to alert the user of certain circumstances, such as informing the user that the carbonation of the fruits or vegetables is complete or that the system has developed a problem, such as a leak or over pressurization.

Display device 112 and input device 114 are also preferred features of the invention. Display device 112 and input device 114 are coupled to microprocessor 110 and send signals to and receive signals from microprocessor 110. Display device 112 and input device 114 are similar to display device 68 and input device 66 of the first embodiment. Input device 114 allows the user to input predetermined settings based on the particular type of food to be carbonated. It should be understood that input device 114 can be a keyboard, a key pad, a set of pushbuttons or other similar devices. Furthermore, input device 114 is optional to the invention and is not necessary if, for example, a fixed program is set in the memory chip of microprocessor 110. Display device 112, such as a liquid crystal display (LCD), displays various items of information to the user, such as providing an error notice to alert the user of a leak or of over pressurization, or to inform the user that the carbonation process is complete.

Turning to FIGS. 12-15, thermally insulated container 106 internally comprises insulated food chamber 126 and $CO_2$ cylinder chamber 128. $CO_2$ cylinder chamber 128 is preferably located below insulated food chamber; however, it should be understood that insulated food chamber 126 and $CO_2$ cylinder chamber 128 could be side by side or in any other configuration. If the user desires to use thermally insulated container 106 as a cooler without carbonating the fruits or vegetables, insulated food chamber 126 can hold food products and beverages, while wet ice or another cooling device can be used to cool the food products and beverages. If the user, however, desires to carbonate fruits and vegetables, $CO_2$ cylinder chamber 128 can preferably contain two $CO_2$ cylinders 130 with compressed $CO_2$, while insulated food chamber 126 can hold the fruits or vegetables to be carbonated.

Two $CO_2$ cylinders are particularly preferred because a second $CO_2$ cylinder provides a backup source of $CO_2$ if one $CO_2$ cylinder ceases to release $CO_2$, and a second $CO_2$ cylinder allows the user to remove one $CO_2$ cylinder without halting the carbonation process. A second $CO_2$ cylinder may also allow for more $CO_2$, may be less expensive than one large $CO_2$ cylinder and may be easier to handle than one large $CO_2$ cylinder. However, it should be understood that $CO_2$ cylinder chamber 128 could contain only a single $CO_2$ cylinder or could be designed to contain more than two $CO_2$ cylinders.

To install $CO_2$ cylinders 130 into thermally insulated container 106, the ends of $CO_2$ cylinders 130 opposite of the ends containing out-flow ports 142 are attached to $CO_2$ cylinder holders 132. $CO_2$ cylinder holders 132 are desirably made of aluminum alloy and have four tabs 134 at each corner. Tabs 134 can be used to easily pick up $CO_2$ cylinders 130 when $CO_2$ cylinders 130 are connected to $CO_2$ cylinder holders 132. Each $CO_2$ cylinder 130 and $CO_2$ cylinder holder 132 can then be placed into thermally insulated container 106 through openings 124 (also shown in FIG. 11). $CO_2$ cylinder housing 136 is a reinforced chamber to house and insulate $CO_2$ cylinders 130. $CO_2$ cylinder housing 136 also guides $CO_2$ cylinders 130 into a position that enables out-flow ports 142 of $CO_2$ cylinders 130 to be properly connected to pin valve 140. $CO_2$ cylinder holders can then be properly screwed to thermally insulated container 106, but it should be understood that when $CO_2$ cylinders 130 are installed into thermally insulated container 106, $CO_2$ cylinder holders 132 and thermally insulated container 106 can be interlocked, snapped together, fastened together or attached by any other similarly effective means. Pin valve 140 is located within valve housing 138, which provides enhanced protection and support for pin valve 140, and provides enhanced protection for out-flow ports 142 when they are connected to pin valve 140.

Once out-flow ports 142 of $CO_2$ cylinders 130 are properly connected to pin valve 140, pin valve 140 is opened. $CO_2$ preferably passes from $CO_2$ cylinders 130 through out-flow ports 142, through pin valve 140 and preferably into two conduits 144 that are attached to pin valve 140. Conduits 144 are also desirably attached to valves 146. Accordingly, $CO_2$ flows from conduits 144 into valves 146, which can be opened and closed by switch 120 (also shown in FIG. 10). If valves 146 are opened, $CO_2$ flows through valves 146 and into preferably four conduits 148. Each conduit 148 is desirably attached at one end to valves 146 and at the other end to insulated food chamber 126 at opening 150. Therefore, $CO_2$ flows from conduits 148 into insulated food chamber 126 to carbonate the fruits or vegetables in insulated food chamber 126.

Figure 11:
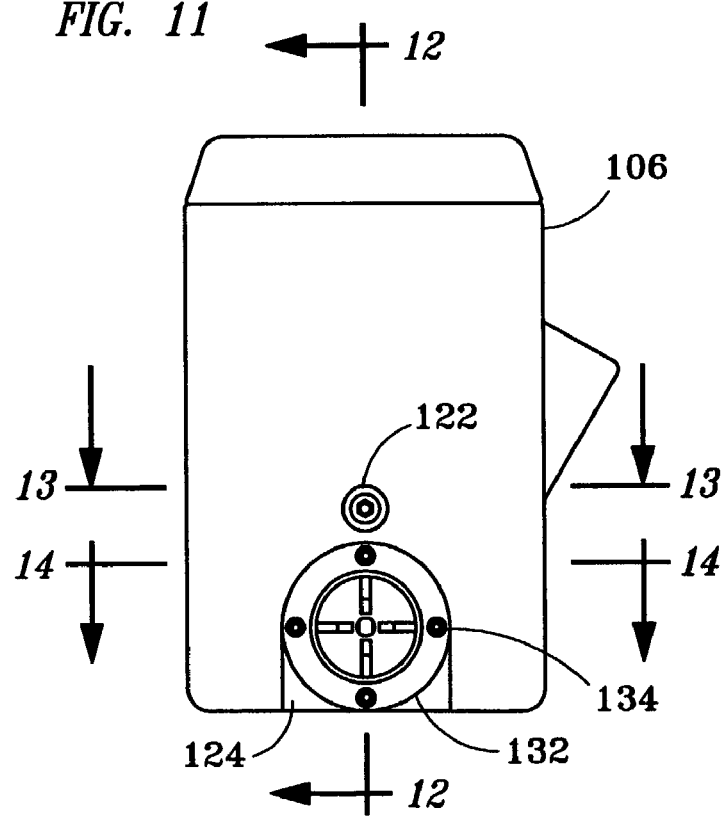
FIG. 11 is a side view of the exterior of the thermally insulated container of FIG. 10.

As shown in FIG. 11, pressure relief device 122 of thermally insulated container 106 is similar to pressure relief device 34 of the first embodiment of the present invention and releases excess pressure caused by the build-up of $CO_2$ in insulated food chamber 126. The excess $CO_2$ is vented to the outside of thermally insulated container 106. Releasing the excess pressure inside insulated food chamber 126 provides consistent carbonation and prevents an explosion caused by extreme pressure trapped in insulated food chamber 126. For a low-cost combination carbonation system and cooler, it is preferred that pressure relief device 122 open at a pressure of less than 1 psi. Pressure relief device 122 is preferably a valve, but can be a vent, disc or other similar device.

Figure 15:
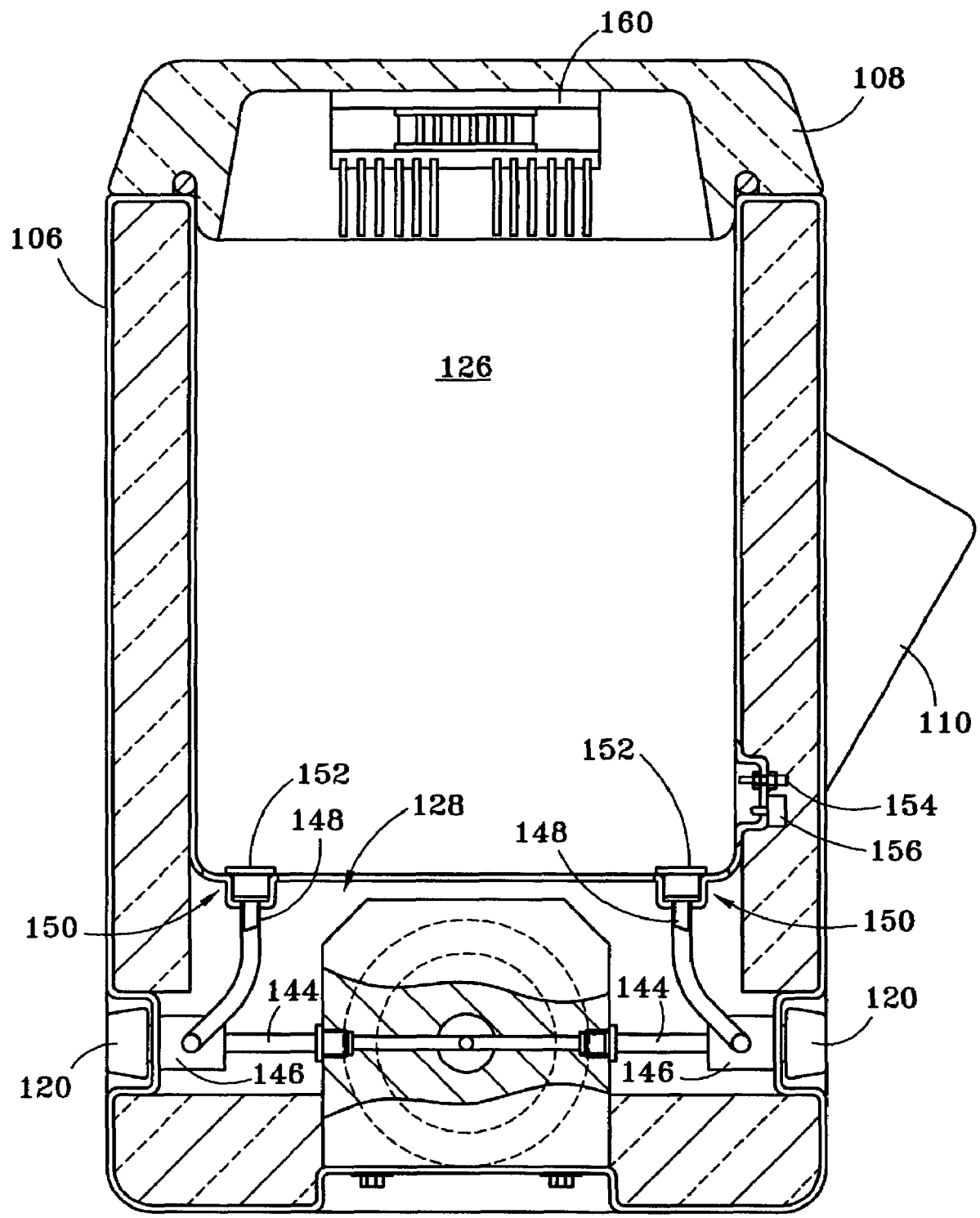
FIG. 15 is a side sectional view taken along line 15-15 of FIG. 10.

Looking specifically at FIG. 15, a measuring device, such as pressure sensor 156, detects the $CO_2$ saturation level of the fruits or vegetables. For example, pressure sensor 156 measures pressure inside insulated food chamber 126 and sends signals to microprocessor 110 regarding the pressure level. Microprocessor 110 can alert the user to open or close valves 146 to control the $CO_2$ supply. Microprocessor 110 can also sound alarm 118 if insulated food chamber 126 is over pressurized or has a leak. Pressure sensor 156 can, like pressure sensor 54 of the first embodiment, also signal microprocessor 110 to alert the user to end the carbonation process when no pressure change has been detected for an extended period of time. This allows combination carbonation system and cooler 104 to reach the maximum level of carbonation at the given pressure level, regardless of the type of food being carbonated. The pressure change inside insulated food chamber 126 is also an indicator for a properly working carbonation system. For example, a sudden pressure drop may indicate leakage of $CO_2$ from insulated food chamber 126. In addition, a slow pressure increase during the initial pressurization of insulated food chamber 126 may also be due to a leak. However, it should be understood that other measuring devices, such as the ones employed with the first embodiment, can be used to detect the $CO_2$ saturation level of the fruits or vegetables.

Another feature shown in FIG. 15, temperature sensor 154, measures the internal temperature of insulated food chamber 126 and sends signals to microprocessor 110 regarding the temperature. To adjust the temperature within insulated food chamber 126, microprocessor 110 uses signals to turn temperature control source 160 on or off. A power supply (not shown) is another feature of the invention and is coupled to microprocessor 110 to supply power thereto. Various power sources can be used including, but not limited to, an alternating current (AC) source, a direct current (DC) source, a solar source or other energy sources.

Figure 13:
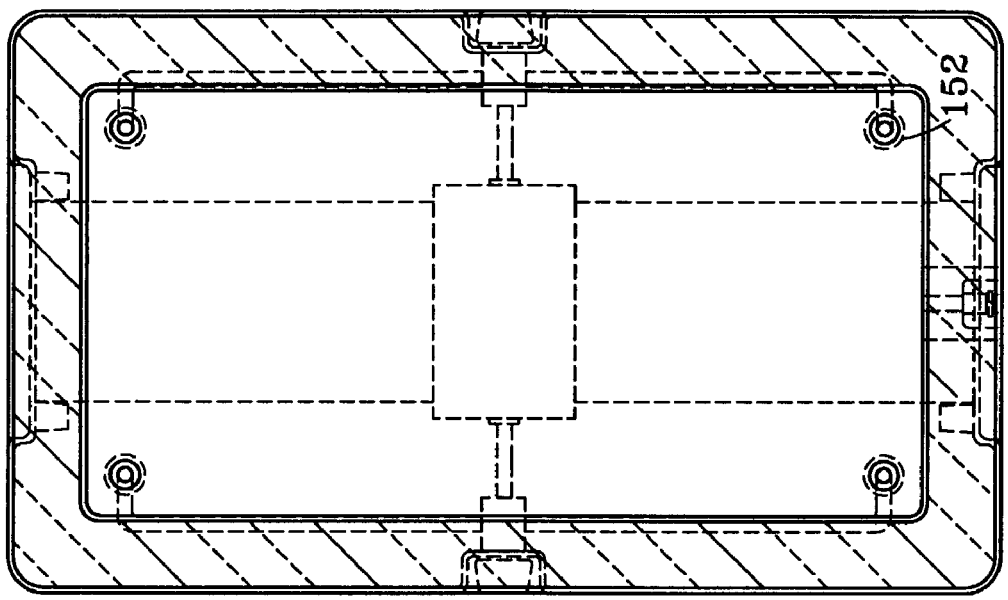
FIG. 13 is a top plan view of the insulated food chamber taken along line 13-13 of FIG. 11, and depicts, in phantom outline, the items in the $CO_2$ cylinder chamber.

Plugs 152 (as shown in FIGS. 13 and 15) can be used when thermally insulated container 106 is employed to cool food products and beverages. Plugs 152 frictionally fit into openings 150 where conduits 148 connect to insulated food chamber 126. Plugs 152 prevent food particles, liquids or other debris in insulated food chamber 126 from blocking the interior of conduits 148. The body of plugs 152 are preferably made from a polymeric or rubber material, but can be made of any similar material that can sufficiently plug conduits 148. The top of plugs 152 can consist of a screen to prevent food particles from plugging conduits 148, or the top of plugs 152 can be solid to prevent liquids from entering conduits 148.

Figure 12:
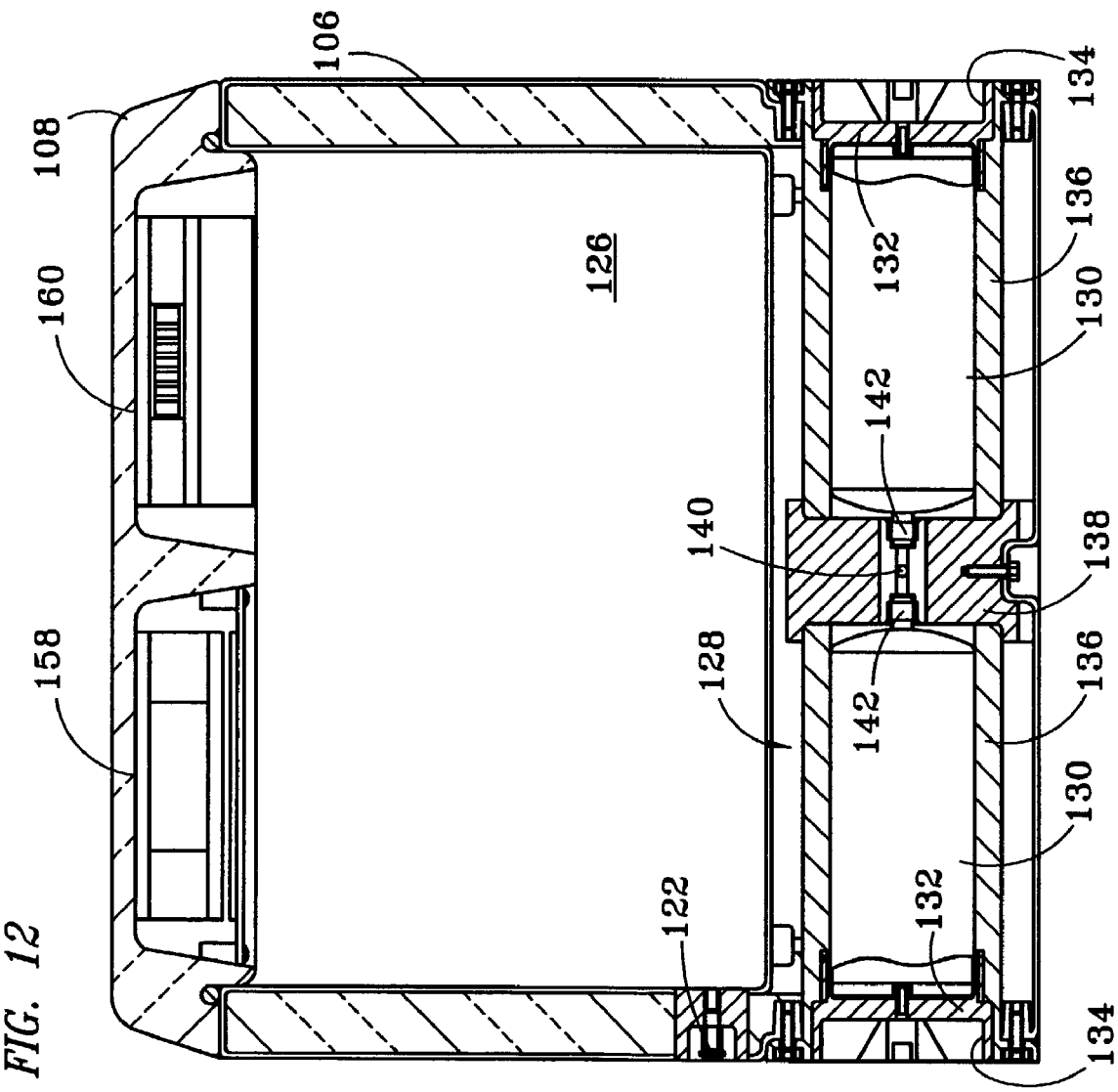
FIG. 12 is a cross-sectional view taken along line 12-12 of FIG. 11.
Figure 14:
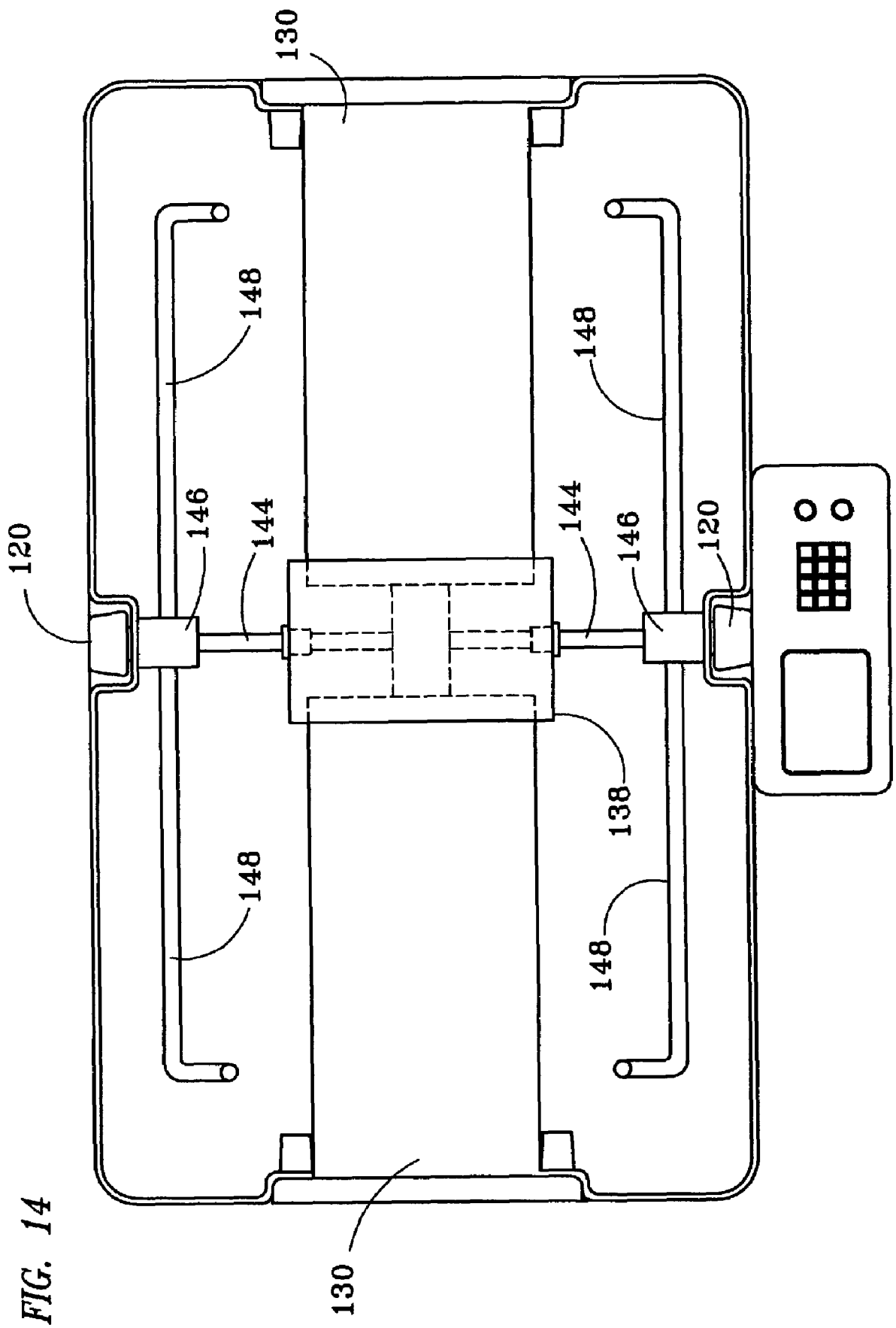
FIG. 14 is a top sectional view of the $CO_2$ cylinder chamber taken along line 14-14 of FIG. 11.

Turning to FIG. 12, fan 158 is desirably located on the underside of lid 108 of thermally insulated container 106. During carbonation, fan 158 is controlled by microprocessor 110 and circulates the air in thermally insulated container 106, which evenly cools thermally insulated container 106 and consistently carbonates the fruits or vegetables therein. Temperature control source 160 is preferably a thermoelectric cooling unit and is also desirably located on the underside of lid 108 of thermally insulated container 106. During carbonation, temperature control source 160 is controlled by microprocessor 110, cools insulated food chamber 126 and maintains the temperature inside insulated food chamber 126 to maximize the amount of $CO_2$ absorbed by the fruits or vegetables. Temperature control source 160 can be powered by a DC power source, an AC power source or any other type of power source. Fan 158 and temperature control source 160 can also be employed when the user desires to use thermally insulated container 106 as a cooler instead of a carbonation system.

During carbonation, insulated food chamber 126 is pressurized by $CO_2$ gas at a psi of about 0 to about 15 and more preferably at a psi of about 5 to about 10. Again, it should be recognized that the psi depends on the type and amount of fruits or vegetables to be carbonated, as well as the type of carbonation system being used. To maximize the absorption of $CO_2$ by the fruits and vegetables, the temperature within insulated food chamber 126 is preferably at about 1° C. to about 20° C., more preferably at about 2° C. to about 4° C.

When thermally insulated container 106 is employed to cool food products and beverages, wet ice or other cooling devices can be placed in insulated food chamber 126 or in $CO_2$ cylinder chamber 128.

Figure 2A:
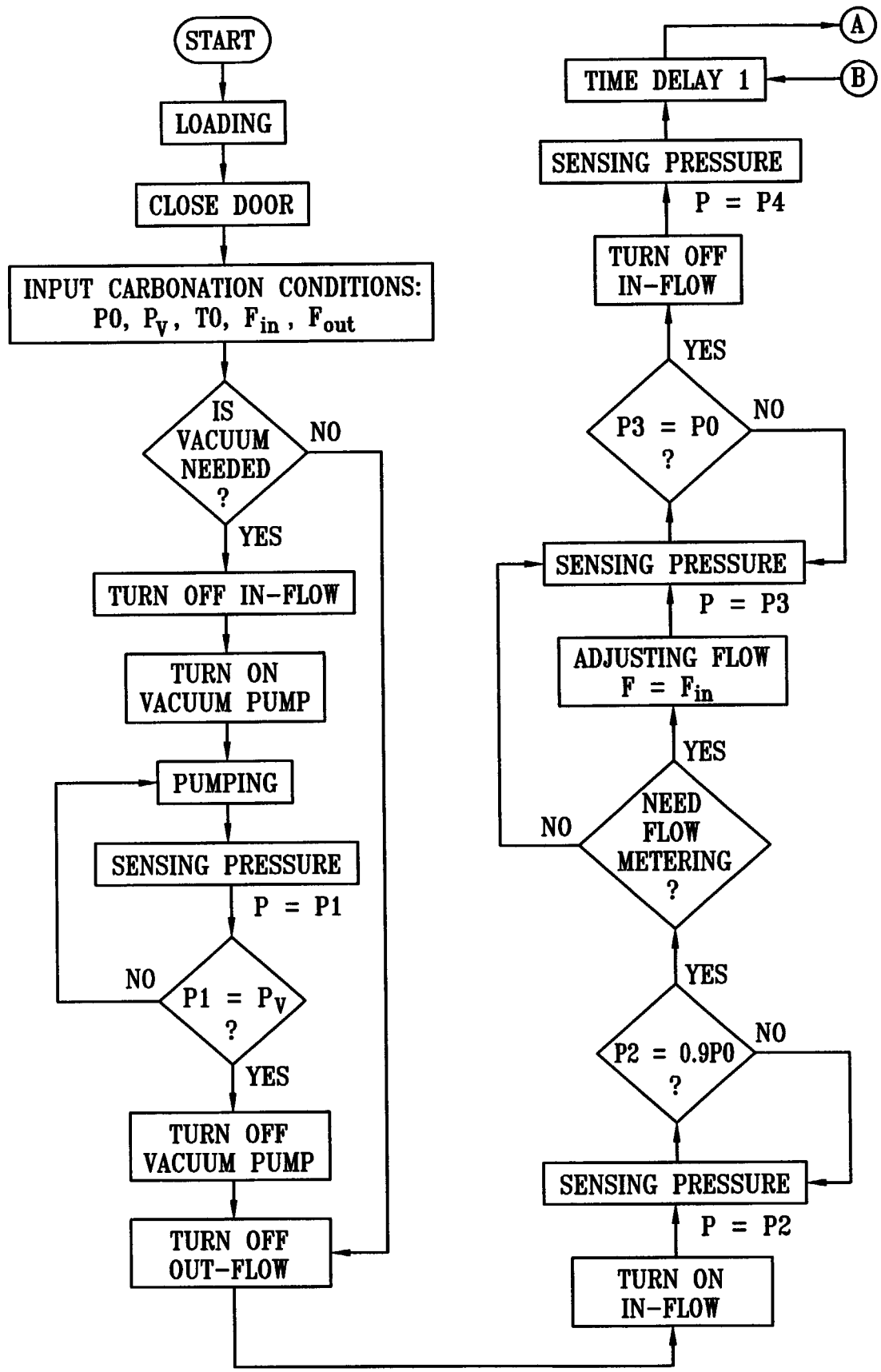
FIGS. 2a and 2b are a flow chart illustrating diagrammatically the method of using the embodiment of FIG. 1.
Figure 2B:
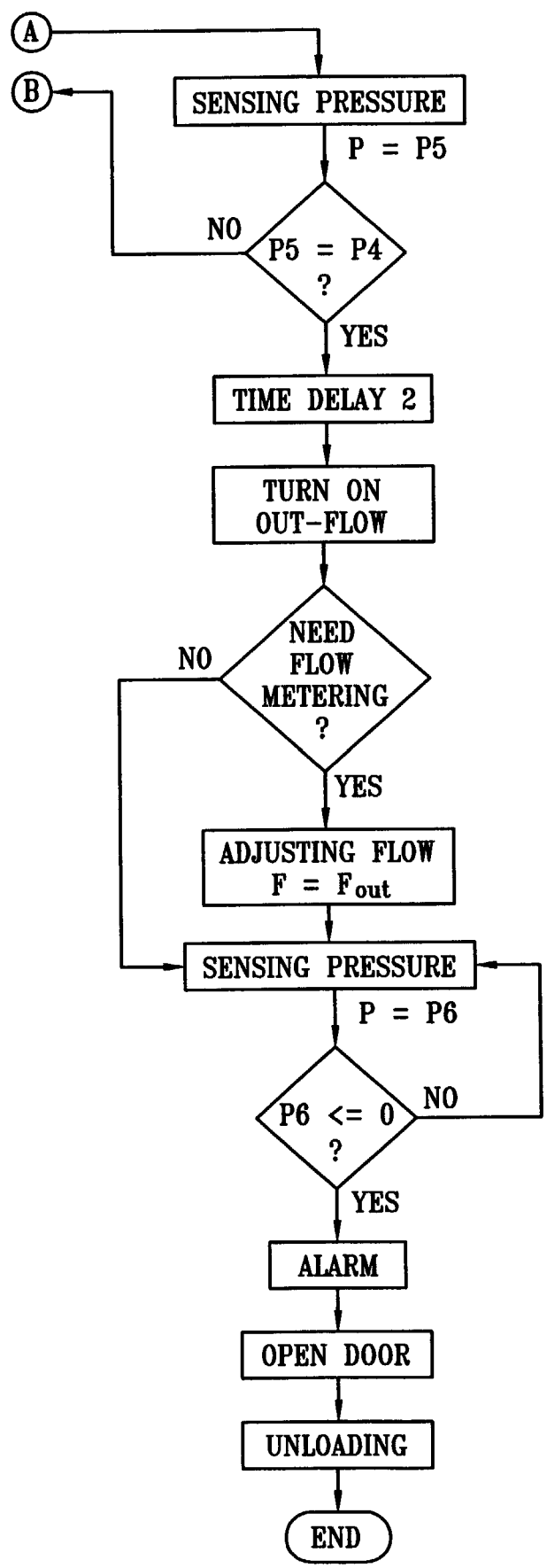
Figure 3:
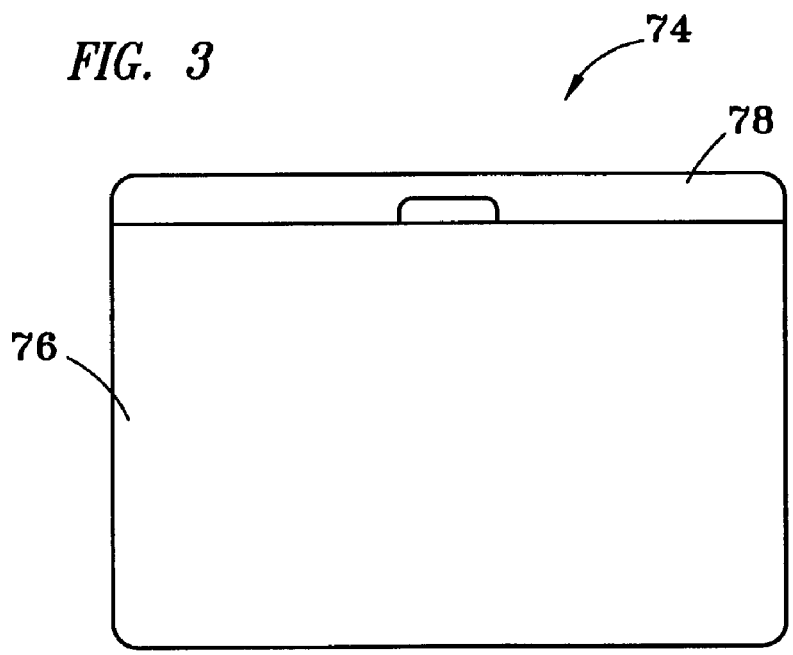
FIG. 3 is a front view of the exterior of the thermally insulated container of another embodiment of the invention.

FIGS. 2a and 2b show a flow chart for the preferred method of using the carbonation system of the first embodiment. The user desirably places fruits or vegetables into internal container 30 and places internal container 30 into sealable enclosure 22. Cover or door 32 of sealable enclosure 22 is then closed and sealed. Electric switch 28 sends a signal to microprocessor 24 when cover or door 22 is closed and when sealable enclosure 22 is sealed. The user will then input specific carbonation conditions depending on the type of fruit or vegetable to be carbonated and the amount of fruits or vegetables to be carbonated. The specific carbonation conditions may include temperature (T0), pressure in the vacuum generator ($P_V$), carbonation pressure (P0), desired flow rates ($F_{in}$ and $F_{out}$) or other control parameters.

The user then has the option to run vacuum generator 48 to remove the air and gases from sealable enclosure 22. The mass of the fruits or vegetables measured by load cell 37 could also determine if the vacuum generator 48 should be used. If vacuuming is needed, inlet control valve 38 is closed and vacuum generator 48 is activated. While emptying sealable enclosure 22, the vacuum pressure (P1) is measured at a desired interval and compared to the preset pressure value ($P_V$) until P1 is equal to $P_V$. Once P1 is equal to $P_V$, vacuum generator 48 is deactivated and outlet control valve 40 is closed. If the user chooses not to use vacuum generator 48, the outlet control valve 40 is closed.

After outlet control valve 40 is closed, inlet control valve 38 is opened. The carbonation pressure increases in sealable enclosure 22 as the $CO_2$ gas flows in and fills sealable enclosure 22. As the pressure inside sealable enclosure 22 is approaching the preset pressure (P0), the inside pressure is preferably measured and the measured pressure (P2) is compared to P0. If the pressure inside sealable enclosure 22 reaches 90% of P0, it needs to be determined whether inlet rate control valve 44 needs to be adjusted to ensure a stable pressure reading by avoiding a sudden closure of inlet control valve 38. If the $CO_2$ in-flow rate needs to be adjusted, the rate is adjusted to the preset flow rate ($F_{in}$). The pressure is preferably again measured (P3) and compared to P0. If P3 is equal to P0, inlet control valve 38 is closed. The carbonation pressure is then desirably measured (P4) again, and carbonation system 20 is allowed to remain stable as the fruits or vegetables gradually absorb $CO_2$ gas.

While the carbonation system 20 remains stable, the gradual absorption of $CO_2$ by the food products, results in a decrease of carbonation pressure. The carbonation pressure is again measured (P5) and compared to P4. If P5 equals P4, the pressure is no longer decreasing indicating the food products have reached their $CO_2$ saturation level. If P5 is not equal to P4, the food products are still absorbing $CO_2$.

After the food products have reached their $CO_2$ saturation level for a given level of pressure and temperature, and carbonation system 20 remains in equilibrium for an extended period of time to ensure that pressure is no longer decreasing, outlet control valve 40 is opened and $CO_2$ is released from sealable enclosure 22. If $CO_2$ is released too quickly from sealable enclosure 22, a large pressure difference may develop between the surface and the core of the food. This large pressure difference may cause the food products to "burst". To avoid the results of the large pressure difference, the outlet rate control valve 46 is preferably used to control the gradual release of the pressure. For high pressure carbonation, greater than about 45 psi, the out-flow rate may need to be reduced to the preset flow rate ($F_{out}$). For low pressure carbonation, however, the out-flow rate likely will not have to be reduced.

The carbonation pressure is preferably measured (P6) once again. When P6 is equal to or less than zero, the carbonation pressure has been completely released and the carbonation process is over. Lastly, alarm 70 is preferably sounded to inform the user that the carbonation process is complete. Cover or door 32 of sealable enclosure 22 can then be opened and the carbonated fruits or vegetables unloaded.

The amount of $CO_2$ absorbed by a food product depends on the carbonation conditions and the composition and physical properties of the food product. The carbonation conditions can include, but are not limited to, temperature, flow rates and pressure, as well as the volume and headspace inside the sealable enclosure and the mass of food being carbonated. The properties of food include moisture content, food texture, firmness or ripeness, skin thickness, sugar content and other properties.

In general, the higher the moisture content of a food product, the higher the $CO_2$ absorption rate; the higher the carbonation pressure, the higher the $CO_2$ absorption rate; and the lower the temperature, the higher the $CO_2$ absorption rate. However, too high pressure may cause physical damage to the food if not properly controlled. Also, the carbonation temperature cannot be lower than 0° C. so that ice does not form. Ice may reduce the $CO_2$ absorption rate of the fruits or vegetables.

The larger the headspace inside the sealable enclosure, the more $CO_2$ is required and the longer it takes to reach a given pressure level. Too small of headspace may cause a problem for the circulation of $CO_2$ around the food, prolonging the carbonation process. The larger the mass of food inside the sealable enclosure, the longer the carbonation process takes and the more $CO_2$ required for carbonation. The flow rate of $CO_2$ in and out of the sealable enclosure will also affect the carbonation process. The larger the in-flow rate the faster the carbonation will occur. The larger the out-flow rate, the less time it takes to unload the pressure from the sealable enclosure. However, the out-flow rate is constrained by the pressure unloading rate, which cannot be unloaded too quickly or the fruits or vegetables may explode or be damaged.

For a given carbonation condition, the actual amount of $CO_2$ being absorbed by the food products or beverages could vary greatly from one food or beverage to another, depending on their compositions and physical properties. For example, soft drinks have higher $CO_2$ absorption than fresh fruits and vegetables, while fresh fruits and vegetables have higher $CO_2$ absorption than dried fruits and vegetables. Even the same fruit may have different $CO_2$ absorption rate. For example, a ripened apple may have a higher absorption rate than an unripe apple due to the ripened apple's high moisture content and softer texture.

The time of carbonation can also vary greatly for a given carbonation condition. Choosing a single treatment time regardless of other parameters would result in widely varying fizziness or carbonation levels, and therefore, an unreliable carbonation process, even among different batches of the same fruit or vegetable.

Other alterations and modifications of the preferred embodiment described above will become apparent to those of ordinary skill in the art upon reading this disclosure, and it is intended that the scope of the invention disclosed herein be limited only by the broadest interpretation of the appended claims to which the inventor is legally entitled.

The invention claimed is:

1. A carbonation system for enhancing the flavor of fruits or vegetables, the carbonation system comprising:
   a selectively sealed and pressurized enclosure having an interior volume sufficient to receive a desired quantity of fruit or vegetable matter;
   a $CO_2$ source in fluid communication with the interior volume to provide $CO_2$ to the sealable enclosure at an increased pressure sufficient to increase the $CO_2$ saturation level of the fruit or vegetable matter;
   wherein the increased $CO_2$ saturation level is sufficient to enhance the flavor of the fruit or vegetable matter;
   a pressure relief device coupled to the sealable enclosure, the pressure relief device relieving overpressure inside the sealable enclosure; and
   a measuring device adapted to measure the $CO_2$ saturation level of the fruits or vegetables within the selectively sealed enclosure during carbonation.

2. The carbonation system of claim 1 comprising a microprocessor programmed to receive data from the measuring device, manipulate the data to detect the $CO_2$ saturation level of the fruits or vegetables inside the sealable enclosure during carbonation, thereby effectively enhancing the flavor of fruits and vegetables.

3. The carbonation system of claim 1 wherein the $CO_2$ source is in fluid communication with the interior volume through an inlet control valve.

4. The carbonation system of claim 3 comprising an outlet control valve in fluid communication with the interior volume.

5. The carbonation system of claim 4 comprising a microprocessor programmed to receive data from the measuring device, manipulate the data to detect the $CO_2$ saturation level of the fruits or vegetables inside the sealable enclosure and send signals to the inlet control valve and the outlet control valve to control pressure inside the sealable enclosure, thereby effectively enhancing the flavor of fruits and vegetables.

6. The carbonation system of claim 1 comprising a temperature control source for cooling the interior volume.

7. The carbonation system of claim 1 wherein the sealable enclosure is a thermally insulated container having first and second chambers therein, the first chamber being capable of receiving a desired quantity of fruit or vegetable matter.

8. The carbonation system of claim 7 wherein the $CO_2$ source is installable in the second chamber, the $CO_2$ source in fluid communication with the first chamber.

9. A carbonation system for enhancing the flavor of fruits or vegetables, the carbonation system comprising:
a selectively sealed and pressurized enclosure having an interior volume sufficient to receive a desired quantity of fruit or vegetable matter, the sealable enclosure having at least one pressure relief device that relieves overpressure in the sealable enclosure and a measuring device to measure $CO_2$ saturation level of the fruits or vegetables within the sealable enclosure during carbonation;
a source of $CO_2$ gas in fluid communication with the sealable enclosure through an inlet control valve, wherein the inlet control valve provides $CO_2$ to the sealable enclosure at an increased pressure sufficient to increase the $CO_2$ saturation level of the fruit or vegetables;
wherein the increased $CO_2$ saturation level is sufficient to enhance the flavor of the fruit or vegetables;
an outlet control valve in fluid communication with the sealable enclosure;
temperature control source for cooling at least part of the sealable enclosure; and
a microprocessor connectable to a power supply and programmed to receive data from the measuring device, manipulate the data to detect the $CO_2$ saturation level of the fruits or vegetables inside the sealable enclosure and send signals to the inlet control valve and the outlet control valve to control pressure inside the sealable enclosure to achieve a desired $CO_2$ saturation level for the fruits or vegetables.

10. The carbonation system of claim 9 wherein the measuring device is a pressure sensor to measure the pressure within the sealable enclosure.

11. The carbonation system of claim 9 wherein the source of $CO_2$ gas is in fluid communication with the sealable enclosure through a first conduit, the first conduit having the inlet control valve disposed thereon.

12. The carbonation system of claim 9 wherein the outlet control valve is in fluid communication with the sealable enclosure through a second conduit.

13. The carbonation system of claim 12 wherein the second conduit extends beyond the outlet control valve and has an outlet rate control valve located downstream from the outlet control valve.

14. The carbonation system of claim 9 wherein the temperature control source is in fluid communication with the sealable enclosure through a third conduit, the temperature control source in communication with and controlled by the microprocessor.

15. The carbonation system of claim 9 wherein the sealable enclosure comprises a temperature sensor in communication with the microprocessor.

16. The carbonation system of claim 9 further comprising a vacuum generator.

17. The carbonation system of claim 16 wherein the vacuum generator is located on a fourth conduit attached to the sealable enclosure, the fourth conduit having a second outlet control valve located upstream from the vacuum generator, the second outlet control valve and the vacuum generator in communication with and controlled by the microprocessor.

18. The carbonation system of claim 11 wherein the first conduit has an inlet rate control valve located downstream from the inlet control valve, the inlet rate control valve in communication with and controlled by the microprocessor.

19. The carbonation system of claim 9 wherein the $CO_2$ source is a container at least partially filled with dry ice.

20. The carbonation system of claim 9 wherein the $CO_2$ source is a $CO_2$ cylinder.

21. The carbonation system of claim 9 wherein the $CO_2$ source is a $CO_2$ generator.

22. The carbonation system of claim 9 wherein the $CO_2$ source is a container that allows for the production of $CO_2$ from a mixture of sodium bicarbonate and an acid.

23. The carbonation system of claim 9 comprising an alarm that is in communication with and controlled by the microprocessor.

24. The carbonation system of claim 9 wherein the sealable enclosure comprises an electrical switch that is in communication with the microprocessor.

25. The carbonation system of claim 9 comprising an input device for inputting specific carbonation conditions, the input device being connected to the microprocessor.

26. The carbonation system of claim 9 comprising a display device being connected to and controlled by the microprocessor.

27. The carbonation system of claim 9 wherein during carbonation the sealable enclosure is pressurized at a psi of about 30 to about 100.

28. The carbonation system of claim 27 wherein during carbonation the sealable enclosure is pressurized at a psi of about 35 to about 45.

29. The carbonation system of claim 9 wherein during carbonation the sealable enclosure has an internal temperature of about 1° C. to about 10° C.

30. The carbonation system of claim 29 wherein during carbonation the sealable enclosure has an internal temperature of about 2° C. to about 4° C.

31. The carbonation system of claim 9 wherein the sealable enclosure has an internal volume that is capable of holding an internal container.

32. The carbonation system of claim 31 comprising a support surface adapted to support the internal container within the sealable enclosure.

33. The carbonation system of claim 31 wherein the internal container comprises an interior configured with layers.

34. The carbonation system of claim 11 wherein the first conduit includes a pressure regulator.

35. The carbonation system of claim 9 wherein the pressure relief device is a valve.

36. The carbonation system of claim 9 wherein the measuring device is a load cell for measuring mass of the fruits and vegetables in the sealable enclosure.

37. The carbonation system of claim 9 wherein the measuring device is responsive to a pH level of the fruits or vegetables in the sealable enclosure.

38. The carbonation system of claim 9 wherein the measuring device is responsive to an electrical conductivity of the fruits or vegetables in the sealable enclosure.

39. A combination carbonation system and cooler for enhancing the flavor of fruits or vegetables, the combination carbonation system and cooler comprising:
a selectively sealed and pressurized, thermally insulated container having an internal reservoir, the internal reservoir having first and second chambers, the first chamber having sufficient interior volume to receive a desired quantity of fruit or vegetable matter;

at least one $CO_2$ source installable in the second chamber to provide $CO_2$ to the first chamber at an increased pressure sufficient to increase the $CO_2$ saturation level of the fruit or vegetable matter;

wherein the increased $CO_2$ saturation level is sufficient to enhance the flavor of the fruit or vegetable matter;

a pressure relief device coupled to the sealable, thermally insulated container, the pressure relief device providing gas pressure relief from the first chamber to outside of the sealable, thermally insulated container during carbonation; and a measuring device adapted to measure the $CO_2$ saturation level of the fruits or vegetables within the selectively sealed enclosure during carbonation.

40. The combination carbonation system and cooler of claim 39 wherein the at least one $CO_2$ source is a container at least partially filled with dry ice.

41. The combination carbonation system and cooler of claim 40 comprising a pressure relief device disposed in the container at least partially filled with dry ice.

42. The combination carbonation system and cooler of claim 41 comprising a conduit connectable to the container at least partially filled with dry ice, the conduit having an open end.

43. The combination carbonation system and cooler of claim 42 comprising a cover dividing the internal reservoir into first and second chambers, the cover having a plurality of apertures.

44. The combination carbonation system and cooler of claim 43 wherein when $CO_2$ gas is released from the container at least partially filled with dry ice, the $CO_2$ gas passes through the open end of the conduit, through the plurality of apertures in the cover and into the first chamber, thereby effectively carbonating the fruit or vegetable matter within the first chamber.

45. The combination carbonation system and cooler of claim 39 wherein the at least one $CO_2$ source is a $CO_2$ cylinder.

46. The combination carbonation system and cooler of claim 45 wherein the $CO_2$ cylinder is connectable to a pin valve housed within the second chamber.

47. The combination carbonation system and cooler of claim 46 comprising at least one inlet control valve connectable to the pin valve by a first conduit, the at least one inlet control valve connectable to the first chamber by at least one second conduit.

48. The combination carbonation system and cooler of claim 47 comprising a microprocessor programmed to receive data from the measuring device during carbonation, manipulate the data to detect the $CO_2$ saturation level of the fruits or vegetables and send signals to a user to control pressure inside the first chamber by opening and closing the at least one inlet control valve, thereby effectively enhancing the flavor of fruits or vegetables.

49. A combination carbonation system and cooler for enhancing the flavor of fruits or vegetables, the combination carbonation system and cooler comprising:

a selectively sealed and pressurized, thermally insulated container having an internal reservoir;

a cover having a plurality of apertures, the cover located within the internal reservoir and dividing the internal reservoir into first and second chambers, the first chamber having sufficient interior volume to receive a desired quantity of fruit or vegetable matter;

at least one $CO_2$ source installable in the second chamber, the at least one $CO_2$ source having a pressure relief device;

a pressure relief device coupled to the sealable, thermally insulated container, the pressure relief device of the sealable, thermally insulated container providing gas pressure relief during carbonation from the second chamber to outside of the sealable, thermally insulated container; wherein when $CO_2$ gas is released from the at least one $CO_2$ source, the $CO_2$ gas passes through the plurality of apertures in the cover and into the first chamber at an increased pressure sufficient to increase the $CO_2$ saturation level of the fruit or vegetable matter;

wherein the increased $CO_2$ saturation level is sufficient to enhance the flavor of the fruit or vegetable matter; and a measuring device adapted to measure the $CO_2$ saturation level of the fruits or vegetables within the selectively sealed enclosure during carbonation.

50. The combination carbonation system and cooler of claim 49 wherein a conduit is connectable to the at least one $CO_2$ source, the conduit having an open end that allows $CO_2$ gas released from the at least one $CO_2$ source to distribute into the first chamber.

51. The combination carbonation system and cooler of claim 50 wherein the conduit has a plurality of apertures that allow $CO_2$ gas released from the at least one $CO_2$ source to distribute into the first chamber.

52. The combination carbonation system and cooler of claim 49 wherein the plurality of apertures of the cover are of generally uniform diameter and generally uniformly spaced to evenly distribute $CO_2$ gas into the first chamber.

53. The combination carbonation system and cooler of claim 49 wherein the cover is a combination heat barrier and heat conductive cover.

54. The combination carbonation system and cooler of claim 49 wherein the sealable, thermally insulated container during carbonation is pressurized at a psi of about 5 to about 15.

55. The combination carbonation system and cooler of claim 49 wherein the sealable, thermally insulated container during carbonation has a temperature of about 1° C. to about 20° C.

56. The combination carbonation system and cooler of claim 49 wherein the at least one $CO_2$ source is a container at least partially filled with dry ice.

57. The combination carbonation system and cooler of claim 50 wherein the conduit is connected to the at least one $CO_2$ source by at least one out-flow port.

58. The combination carbonation system and cooler of claim 57 wherein the conduit is attached to the at least one out-flow port by a connector.

59. The combination carbonation system and cooler of claim 58 wherein the connector is a quick connector.

60. The combination carbonation system and cooler of claim 57 wherein the at least one $CO_2$ source has two out-flow ports.

61. The combination carbonation system and cooler of claim 49 wherein two $CO_2$ sources are installable into the second chamber.

62. The combination carbonation system and cooler of claim 49 wherein the pressure relief device of the sealable, thermally insulated container is a valve.

63. A combination carbonation system and cooler for enhancing the flavor of fruits or vegetables, the combination carbonation system and cooler comprising:

a selectively sealed and pressurized, thermally insulated container having an internal reservoir, the internal reservoir having first and second chambers, the first chamber having sufficient interior volume to receive a desired quantity of fruit or vegetable matter;

a pin valve housed within the second chamber;

at least one inlet control valve connectable to the pin valve by a first conduit, the at least one inlet control valve connectable to the first chamber by at least one second conduit;

at least one $CO_2$ source installable in the second chamber to provide $CO_2$ to the first chamber at an increased pressure sufficient to increase the $CO_2$ saturation level of the fruit or vegetable matter, the at least one $CO_2$ source connectable to the pin valve;

a pressure relief device coupled to the sealable, thermally insulated container, the pressure relief device providing gas pressure relief from the first chamber to outside of the sealable, thermally insulated container during carbonation;

a measuring device adapted to measure $CO_2$ saturation level of the fruits or vegetables during carbonation; and a microprocessor programmed to receive data from the measuring device during carbonation, manipulate the data to detect the $CO_2$ saturation level of the fruits or vegetables and send signals to a user to control pressure inside the first chamber by opening and closing the at least one inlet control valve, to achieve an increased $CO_2$ saturation level of the fruits or vegetables that enhances the flavor of the fruits or vegetables.

64. The combination carbonation system and cooler of claim 63 wherein the microprocessor sends signals to the user to open and close the at least one inlet control valve by using a switch, thereby controlling the pressure inside the first chamber.

65. The combination carbonation system and cooler of claim 63 comprising a temperature sensor at least partially disposed within the sealable, thermally insulated container, the temperature sensor in communication with the microprocessor.

66. The combination carbonation system and cooler of claim 63 comprising a temperature control source, the temperature control source in communication with and controlled by the microprocessor.

67. The combination carbonation system and cooler of claim 63 comprising a fan that circulates the air inside the sealable, thermally insulated container, the fan in communication with and controlled by the microprocessor.

68. The combination carbonation system and cooler of claim 63 comprising an input device for inputting specific carbonation conditions, the input device being connected to and controlled by the microprocessor.

69. The combination carbonation system and cooler of claim 63 comprising a display device being connected to and controlled by the microprocessor.

70. The combination carbonation system and cooler of claim 63 wherein during carbonation the sealable, thermally insulated container is pressurized at a psi of about 5 to about 15.

71. The combination carbonation system and cooler of claim 63 wherein during carbonation the sealable, thermally insulated container has an internal temperature of about 1° C. to about 20° C.

72. The combination carbonation system and cooler of claim 63 wherein the pressure relief device is a valve.

73. The combination carbonation system and cooler of claim 63 comprising at least one plug installable into an opening where the at least one second conduit attaches to the first chamber.

74. The combination carbonation system and cooler of claim 63 comprising an alarm that is in communication with and controlled by the microprocessor.

75. The combination carbonation system and cooler of claim 63 comprising an indication light that is in communication with and controlled by the microprocessor.

76. The combination carbonation system and cooler of claim 63 wherein the at least one $CO_2$ source is a $CO_2$ cylinder.

77. The combination carbonation system and cooler of claim 76 wherein two $CO_2$ cylinders are installable in the second chamber.

78. The combination carbonation system and cooler of claim 76 wherein the at least one $CO_2$ cylinder is connectable to a $CO_2$ cylinder holder.

79. The combination carbonation system and cooler of claim 78 wherein the $CO_2$ cylinder holder comprises four tabs.

80. The combination carbonation system and cooler of claim 76 comprising a housing inside of the second chamber to guide the at least one $CO_2$ cylinder into position.

81. The combination carbonation system and cooler of claim 63 wherein the measuring device is a pressure sensor to measure pressure within the sealable, thermally insulated container.

82. A method of using a carbonation system for enhancing the flavor of fruits or vegetables, the method comprising:

placing the fruits or vegetables in a sealable enclosure;

sealing the sealable enclosure such that $CO_2$ gas can be sealed within sealable enclosure;

presetting specific carbonation conditions based upon composition and physical property of the fruits or vegetables and amount of fruits or vegetables to be carbonated;

closing an outlet control valve such that $CO_2$ gas can remain in the sealable enclosure;

opening an inlet control valve to allow for the introduction of $CO_2$ gas into the sealable enclosure;

introducing $CO_2$ gas into the sealable enclosure;

measuring pressure inside the sealable enclosure and comparing measured pressure to preset pressure;

closing inlet control valve when measured pressure is equivalent to preset pressure;

leaving the fruits or vegetables in the sealable enclosure to absorb $CO_2$ gas such that the fruits or vegetables will take up at least enough $CO_2$ gas to acquire an effervescent flavor;

measuring pressure inside the sealable enclosure to evaluate if measured pressure is decreasing;

opening the outlet control valve when measured pressure is no longer decreasing and the carbonation system has remained stable for an extended period of time, such that when the outlet control valve is opened the pressure can be released from the sealable enclosure; and removing the carbonated fruits or vegetables from the sealable enclosure when the pressure has been released from the sealable enclosure.

83. The method of claim 82 further comprising evaluating whether to run a vacuum device.

84. The method of claim 82 further comprising measuring pressure and comparing measured pressure to preset pressure to evaluate whether to adjust an inlet rate control valve.

85. The method of claim 82 further comprising evaluating whether to adjust an outlet rate control valve.

* * * * *